US009552547B2

(12) United States Patent
Leeman-Munk et al.

(10) Patent No.: US 9,552,547 B2
(45) Date of Patent: Jan. 24, 2017

(54) NORMALIZING ELECTRONIC COMMUNICATIONS USING A NEURAL-NETWORK NORMALIZER AND A NEURAL-NETWORK FLAGGER

(71) Applicants: SAS Institute Inc., Cary, NC (US); North Carolina State University, Raleigh, NC (US)

(72) Inventors: Samuel Paul Leeman-Munk, Raleigh, NC (US); Wookhee Min, Raleigh, NC (US); Bradford Wayne Mott, Apex, NC (US); James Curtis Lester, II, Raleigh, NC (US); James Allen Cox, Cary, NC (US)

(73) Assignees: SAS INSTITUTE INC., Cary, NC (US); NORTH CAROLINA STATE UNIVERSITY, Raleigh, NC (US)

( * ) Notice: Subject to any disclaimer, the term of this patent is extended or adjusted under 35 U.S.C. 154(b) by 0 days.

(21) Appl. No.: 14/937,810

(22) Filed: Nov. 10, 2015

(65) Prior Publication Data

US 2016/0350650 A1 Dec. 1, 2016

Related U.S. Application Data

(60) Provisional application No. 62/168,073, filed on May 29, 2015.

(51) Int. Cl.
*G06N 3/08* (2006.01)
*G06N 3/04* (2006.01)

(52) U.S. Cl.
CPC ........ *G06N 3/08* (2013.01); *G06N 3/04* (2013.01); *G06N 3/0454* (2013.01)

(58) Field of Classification Search
None
See application file for complete search history.

(56) References Cited

U.S. PATENT DOCUMENTS 5,680,627 A * 10/1997 Anglea ............... G06N 3/04
704/1
5,727,081 A * 3/1998 Burges ............... G06K 9/342
382/161

(Continued)

FOREIGN PATENT DOCUMENTS

EP 0622752 A2 * 11/1994 ............... G06K 9/72

OTHER PUBLICATIONS

Li et al. Neural Network Approaches for Noisy Language Modeling. IEEE Transactions on Neural Networks and Learning Systems, vol. 24, No. 11, Nov. 2013.*

(Continued)

*Primary Examiner* — Stanley K Hill
*Assistant Examiner* — Robert H Bejcek, II
(74) *Attorney, Agent, or Firm* — Kilpatrick Townsend & Stockton LLP

(57) ABSTRACT

Electronic communications can be normalized using neural networks. For example, an electronic representation of a noncanonical communication can be received. A normalized version of the noncanonical communication can be determined using a normalizer including a neural network. The neural network can receive a single vector at an input layer of the neural network and transform an output of a hidden layer of the neural network into multiple values that sum to a total value of one. Each value of the multiple values can be a number between zero and one and represent a probability of a particular character being in a particular position in the normalized version of the noncanonical communication. The neural network can determine the normalized version of the noncanonical communication based on the multiple values. Whether the normalized version should be output can be determined based on a result from a flagger including another neural network.

27 Claims, 15 Drawing Sheets

(56) References Cited

U.S. PATENT DOCUMENTS

| | | | |
|---|---|---|---|
| 5,845,285 A * | 12/1998 | Klein | G06F 11/1612 |
| 6,728,695 B1 | 4/2004 | Pathria et al. | |
| 7,788,087 B2 | 8/2010 | Corston-Oliver et al. | |
| 8,756,183 B1 | 6/2014 | Daily et al. | |
| 8,775,341 B1 * | 7/2014 | Commons | G06N 3/0454 706/20 |
| 9,280,747 B1 | 3/2016 | Jin et al. | |
| 2005/0026198 A1 | 2/2005 | Balac Sipes et al. | |
| 2005/0226512 A1 * | 10/2005 | Napper | G06K 9/00872 382/229 |
| 2010/0054539 A1 * | 3/2010 | Challa | G06K 9/3258 382/105 |
| 2010/0234246 A1 | 9/2010 | Jung et al. | |
| 2012/0262461 A1 | 10/2012 | Fisher et al. | |
| 2014/0188459 A1 | 7/2014 | Fink et al. | |
| 2014/0229158 A1 * | 8/2014 | Zweig | G06N 3/04 704/9 |
| 2015/0339570 A1 | 11/2015 | Scheffler | |
| 2016/0027437 A1 | 1/2016 | Hong | |
| 2016/0098386 A1 | 4/2016 | Rangarajan | |
| 2016/0117441 A1 | 4/2016 | Bremel | |
| 2016/0247061 A1 * | 8/2016 | Trask | G06N 3/08 |

OTHER PUBLICATIONS

Hodge et al. A Comparison of Standard Spell Checking Algorithms and a Novel Binary Neural Approach. IEEE Transactions on Knowledge and Data Engineering, vol. 15, No. 5, Sep./Oct. 2003.*

Collobert et al. A Unified Architecture for Natural Language Processing: Deep Neural Networks with Multitask Learning. Proceedings of the 25 th International Conference on Machine Learning, Helsinki, Finland, 2008.*

Hodge et al. A comparison of a novel neural spell checker and standard spell checking algorithms. Pattern Recognition 35 (2002) 2571-2580.*

Kukick, Karen. Techniques for Automatically Correcting Words in Text. ACM Computing Surveys, vol. 24, No. 4, Dec. 1992.*

Ghiassi et al. Twitter brand sentiment analysis: A hybrid system using n-gram analysis and dynamic artificial neural network. Expert Systems with Applications 40 (2013) 6266-6282.*

Lewellen, Mark. Neural Network Recognition of Spelling Errors. Annual Meeting of the Association of Computational Linguistics . 1998.*

Chrupał a, Grzegorz. Normalizing tweets with edit scripts and recurrent neural embeddings. Proceedings of the 52nd Annual Meeting of the Association for Computational Linguistics (Short Papers), pp. 680-686, Baltimore, Maryland, USA, Jun. 23-25, 2014.*

Dahl et al. Context-Dependent Pre-Trained Deep Neural Networks for Large-Vocabulary Speech Recognition. IEEE Transactions on Audio, Speech, and Language Processing, vol. 20, No. 1, Jan. 2012.*

Su et al. Error Back Propagation for Sequence Training of Context-Dependent Deep Networks for Conversational Speech Transcription. ICASSP 2013.*

Gupta et al. Spell Checking Techniques in NLP: A Survey. International Journal of Advanced Research in Computer Science and Software Engineering. vol. 2, Issue 12, Dec. 2012.*

Lewis, Gene. Sentence Correction Using Recurrent Neural Networks. 2016.*

Sakaguchi et al. Robsut Wrod Reocginiton via semi-Character Recurrent Neural Networks. 2016.*

Bastien et al., "Theano: new features and speed improvements" arXiv:1211.5590v1 cs.SC (Nov. 23, 2012) 10 pages.

Bengio "Learning Deep Architectures for AI" Foundations and Trends in Machine Learning vol. 2, No. 1 (2009) pp. 1-127.

Bergstra et al., "Theano: A CPU and GPU Math Compiler in Python" Proc. of the 9th Python in Science Conf. (SCIPY 2010) 8 pages.

Collobert et al., "Natural Language Processing (almost) from Scratch" arXiv:1103.0398v1 cs.LG (Mar. 2, 2011) 47 pages.

Kalchbrenner et al., "A Convolutional Neural Network for Modelling Sentences" Department of Computer Science University of Oxford (2010) 11 pages.

Rumelhart et al., "Learning representations by back-propagating errors" Nature vol. 323 (Oct. 9, 1986), 4 pages.

Srivastava et al., "Dropout: A Simple Way to Prevent Neural Networks from Overfitting" Journal of Machine Learning Research 15 (2014) 1929-1958.

Vincent et al., "Extracting and Composing Robust Features with Denoising Autoencoders" Dept. IRO, Universit'e de Montr'eal C.P. 6128, Montreal, Qc, H3C 3J7, Canada Technical Report 1316(Feb. 2008) 16 pages.

Yosinski et al., "How transferable are features in deep neural networks?" arXiv:1411.1792v1 cs.LG (Nov. 6, 2014)14 pages.

Zeiler et al.,"On Rectified Linear Units for Speech Processing" New York University, USA (2011) 5 pages.

Levenshtein V.I. "Binary Codes Capable of Correcting Deletions, Insertions, and Reversals" Soviet Physics—Doklady vol. 10. No. 8 (1966) 4 pages.

Clay , "Weighted mean from a set of average and standard deviation pairs", http://math.stackexchange.com/questions/654138/weighted-mean-from-a-set-of-average-and-standard-deviation-pairs, Jan. 28, 2014.

Glorot, et al., "Domain adaptation for large-scale sentiment classification: a deep learning approach", Proc. fo the 28th Intl. Conf. on Machine Learning, 2011, pp. 513-520.

Moraes et al., "Document-level sentiment classification: An empirical comparison between SVM and ANN", Expert Systems with Applications, vol. 40(2), Feb. 1, 2013, pp. 621-633.

Ramaswamy , "Visualization of the Sentiment of Tweets", Masters Thesis, North Carolina State University, 2011, pp. 69.

Zhang , "Sentiment analysis of Chinese documents: From sentence to document level", Journal of the American Society for Inform. Sci. and Tech, vol. 60, No. 12, Dec. 2009, pp. 2474-2487.

Healey, C. https://www.csc.ncsu.edu/faculty/healey/tweet_viz/tweet_app/ Faculty webpage, verifed by the Internet Archive: Wayback Machine to have existed since at least before 2013, 5 pages.

Dos Santos, C. et al., "Deep convolutional neural networks for sentiment analysis of short texts," Inti. Conf. on Computational Linguistics (COLING 2014) pp. 69-78.

Kohli, A. http://amitkohli.com/sentiment-analysis-on-my-girl-friends-text-messages/ blog post on Sep. 11, 2015, 9 pages.

Non-Final Office Action of May 5, 2016 for U.S. Appl. No. 14/967,619; 49 pages.

Non-Final Office Action of Jun. 29, 2016 for U.S. Appl. No. 14/966,117; 18 pages.

Non-Final Office Action of Jul. 1, 2016 for U.S. Appl. No. 14/966,380, 16 pages.

* cited by examiner

|  | | | | |
|---|---|---|---|---|
| 1002 ▶ | 1.8 | 2.2 | 1.2 | 0.7 |
| 1003 ▶ | 1.3 | 1.1 | 2.1 | 0.3 |
| 1004 ▶ | 2.5 | 1.7 | 0.5 | 0.8 |
| 1005 ▶ | 1.1 | 0.3 | 2.1 | 1.3 |
| | ▲ 1008 | ▲ 1009 | ▲ 1010 | ▲ 1011 |

|  | | | | |
|---|---|---|---|---|
| 1102 ▶ | 0.40 | 0.10 | 0.26 | 0.24 |
| 1103 ▶ | 0.24 | 0.20 | 0.26 | 0.30 |
| 1104 ▶ | 0.50 | 0.25 | 0.25 | 0.00 |
| 1105 ▶ | 0.70 | 0.25 | 0.03 | 0.02 |
| | ▲ 1108 | ▲ 1109 | ▲ 1110 | ▲ 1111 |

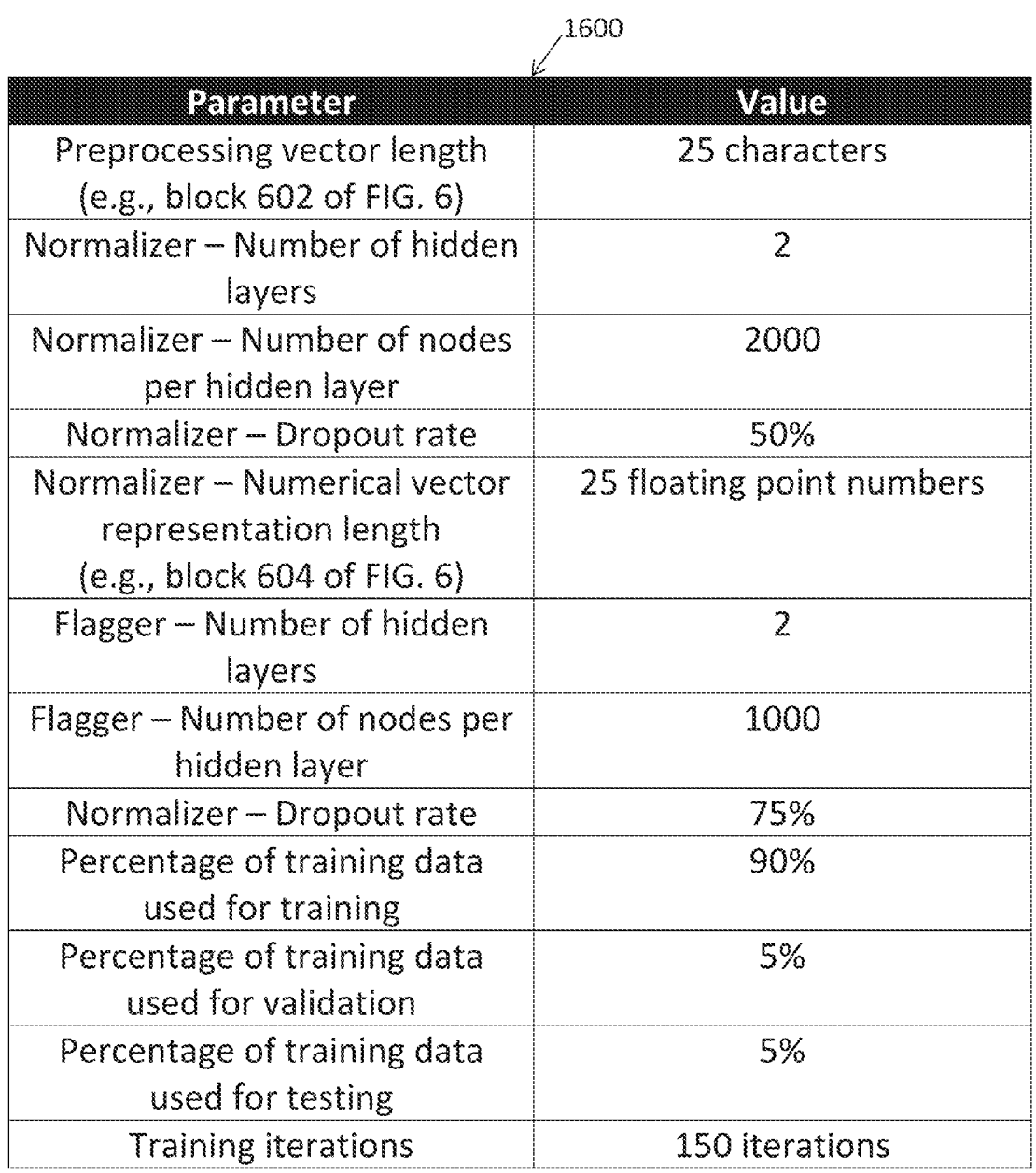

| Parameter | Value |
|---|---|
| Preprocessing vector length (e.g., block 602 of FIG. 6) | 25 characters |
| Normalizer – Number of hidden layers | 2 |
| Normalizer – Number of nodes per hidden layer | 2000 |
| Normalizer – Dropout rate | 50% |
| Normalizer – Numerical vector representation length (e.g., block 604 of FIG. 6) | 25 floating point numbers |
| Flagger – Number of hidden layers | 2 |
| Flagger – Number of nodes per hidden layer | 1000 |
| Normalizer – Dropout rate | 75% |
| Percentage of training data used for training | 90% |
| Percentage of training data used for validation | 5% |
| Percentage of training data used for testing | 5% |
| Training iterations | 150 iterations |

FIG. 16

NORMALIZING ELECTRONIC COMMUNICATIONS USING A NEURAL-NETWORK NORMALIZER AND A NEURAL-NETWORK FLAGGER

REFERENCE TO RELATED APPLICATION

This claims priority under 35 U.S.C. §119(e) to U.S. Provisional Patent Application No. 62/168,073, titled "Deep Encoding and Reconstruction for Normalization of Noisy Text" and filed May 29, 2015, the entirety of which is hereby incorporated by reference herein.

TECHNICAL FIELD

The present disclosure relates generally to normalizing electronic communications. More specifically, but not by way of limitation, this disclosure relates to normalizing electronic communications using neural networks.

BACKGROUND

With the rise of the Internet and mobile electronic devices, users are generating increasing amounts of electronic content. Electronic content often takes the form of forum posts, text messages, social networking posts, blog posts, e-mails, or other electronic communications. In many cases, electronic content can include shorthand words, slang, acronyms, misspelled words, incorrect grammar, and other informalities.

SUMMARY

In one example, a computer readable medium comprising program code executable by a processor is provided. The program code can cause the processor to receive an electronic representation of a noncanonical communication. The program code can cause the processor to determine a normalized version of the noncanonical communication using a normalizer comprising a first neural network. The first neural network can be configured to receive a single vector at an input layer of the first neural network. The first neural network can be configured to transform an output of a hidden layer of the first neural network into a plurality of values that sum to a total value of one, each value of the plurality of values being a number between zero and one and representing a probability of a particular character being in a particular position in the normalized version of the noncanonical communication. The first neural network can be configured to determine the normalized version of the noncanonical communication based on the plurality of values. The program code can cause the processor to determine that the normalized version of the noncanonical communication should be outputted based on a result from a flagger comprising a second neural network that is trained separately from the first neural network.

In another example, a method is provided that can include receiving an electronic representation of a noncanonical communication. The method can include determining a normalized version of the noncanonical communication using a normalizer comprising a first neural network. The first neural network can receive a single vector at an input layer of the first neural network. The first neural network can transform an output of a hidden layer of the first neural network into a plurality of values that sum to a total value of one, each value of the plurality of values being a number between zero and one and representing a probability of a particular character being in a particular position in the normalized version of the noncanonical communication. The first neural network can determine the normalized version of the noncanonical communication based on the plurality of values. The method can include determining that the normalized version of the noncanonical communication should be outputted based on a result from a flagger comprising a second neural network that is trained separately from the first neural network.

In another example, a system is provided that can include a processing device and a memory device. The memory device can include instructions executable by the processing device for causing the processing device to receive an electronic representation of a noncanonical communication. The instructions can be for causing the processing device to determine a normalized version of the noncanonical communication using a normalizer comprising a first neural network. The first neural network can be configured to receive a single vector at an input layer of the first neural network. The first neural network can be configured to transform an output of a hidden layer of the first neural network into a plurality of values that sum to a total value of one, each value of the plurality of values being a number between zero and one and representing a probability of a particular character being in a particular position in the normalized version of the noncanonical communication. The first neural network can be configured to determine the normalized version of the noncanonical communication based on the plurality of values. The instructions can be for causing the processing device to determine that the normalized version of the noncanonical communication should be outputted based on a result from a flagger comprising a second neural network that is trained separately from the first neural network.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 10 is an example of a matrix in which the variables of FIG. 9 are shown as their respective floating-point numbers according to some aspects.

FIG. 11 is an example of a matrix including multiple probabilities according to some aspects.

FIG. 16 is a table of parameters for an example of an implementation according to some aspects.

Figure 1:
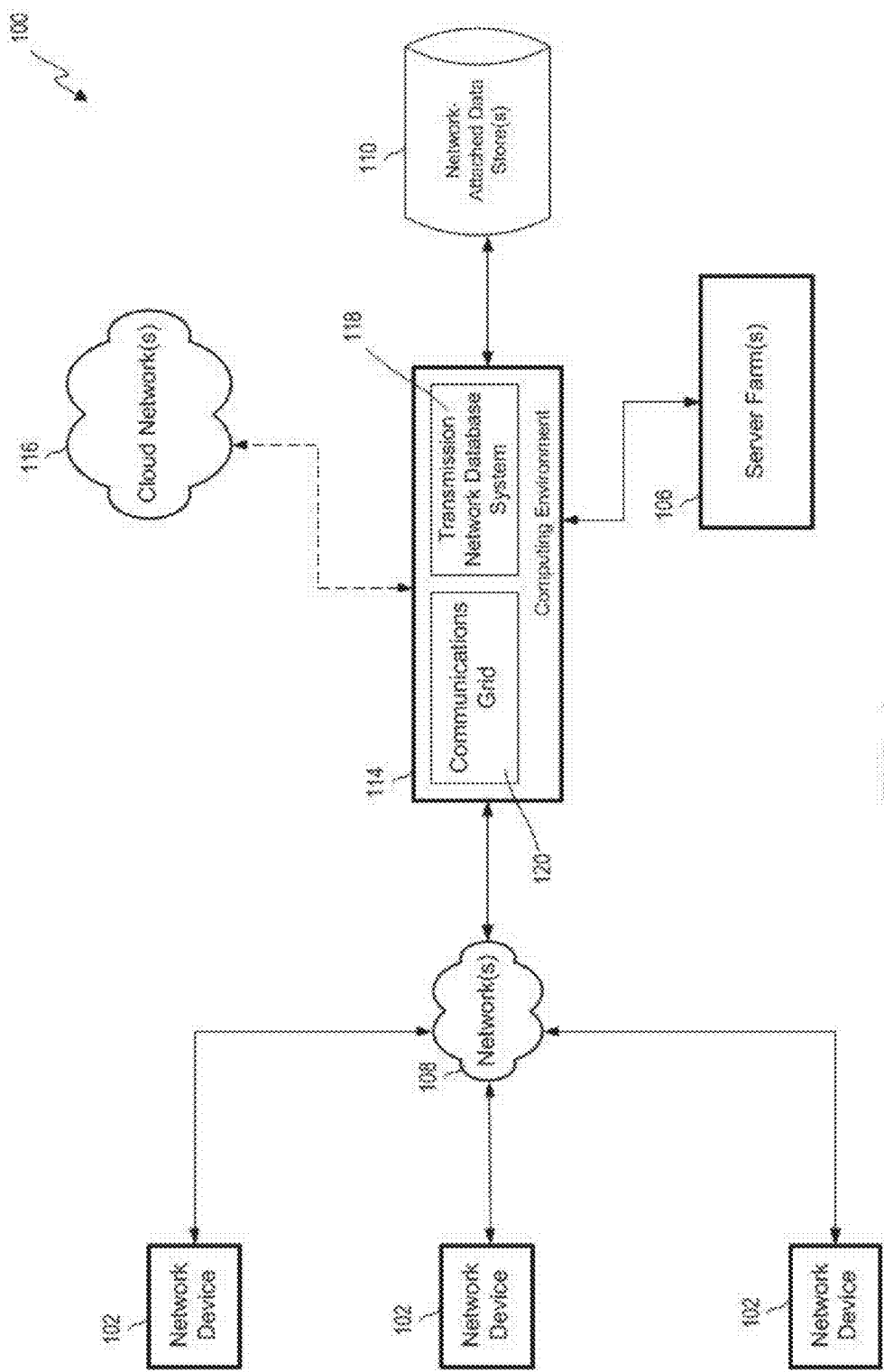
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provide those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to normalizing electronic communications using neural networks. An electronic communication can include a communication from an electronic device, such as a computing device. The electronic communication can include one or more (textual) words that are in a noncanonical form. In some examples, a word can be in a noncanonical form if the word is misspelled according to an accepted and standardized spelling of the word or does not comport with one or more standardized grammatical rules. For example, "ur" can be a noncanonical form of the word "you're." As another example, "you're" can be a noncanonical version of the word "your," if the grammatical context calls for the word "your" rather than "you're." A word can additionally or alternatively be in a noncanonical form if the word includes a combination of two or more sub-words. For example, "yessir" can be a noncanonical form of the words "yes sir," "wassup" can be a noncanonical form of the words "what is up" or "what's up," and "lemmeknow" can be a noncanonical form of the words "let me know." In some examples, a word can be in a noncanonical form if the word is split into two or more words. For example, "l o v e" can be a noncanonical form of the word "love," and "ho pe" can be a noncanonical form of the word "hope." A word that is in a noncanonical form can be referred to as a noncanonical word, and an electronic communication containing a noncanonical word can be referred to as a noncanonical communication. It can be challenging to analyze noncanonical words in an electronic communication, such as to perform textual analysis. It can be desirable to normalize noncanonical words into their canonical forms, such as to simplify textual analysis.

In some examples, a computing device can determine a normalized version of a noncanonical word using at least two neural networks. The computing device can use a first neural network, which can be referred to as a normalizer, to determine a canonical form of the noncanonical word. For example, the computing device can use the first neural network to determine that a normalized version of the noncanonical term "u" is "you." In some examples, the computing device can provide the normalized version of the noncanonical communication to a conformer. The conformer can correct for minor errors in the normalized version of the noncanonical communication. For example, if the first neural network determines that the normalized version of the noncanonical term "u" is "youa," the conformer can correct "youa" to "you." This can reduce errors in the normalized version of the noncanonical communication.

Additionally, the computing device can use a second neural network, which can be referred to as a flagger, to analyze the noncanonical word and determine if the noncanonical word should be normalized. If the second neural network determines that the noncanonical word should be normalized, the computing device can output the normalized version of the noncanonical word. If the second neural network determines that the noncanonical word should not be normalized, the computing device can output the original noncanonical word.

FIGS. 1-4 depict examples of systems usable for normalizing electronic communications using neural networks. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120.

Data transmission network 100 also includes one or more network devices 102. Network devices 102 may include client devices that can communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices can transmit electronic messages with noncanonical information, either all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data with noncanonical information to a network-attached data store 110 for storage. The computing environment 114 may later retrieve the data from the network-attached data store 110 and use the data for textual analysis.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as data from a website (e.g., a forum post, a Twitter™ tweet, a Facebook™ post, a blog post, an online review), a text message, an e-mail, or any combination of these.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time. As another example, website data may be analyzed to determine one or more trends in comments, posts, or other data provided by users.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for performing data analytics or textual analysis on data that includes noncanonical information.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for normalizing electronic communications using neural networks. For example, the computing environment 114, a network device 102, or both can implement one or more versions of the processes discussed with respect to FIGS. 5-14.

Figure 2:
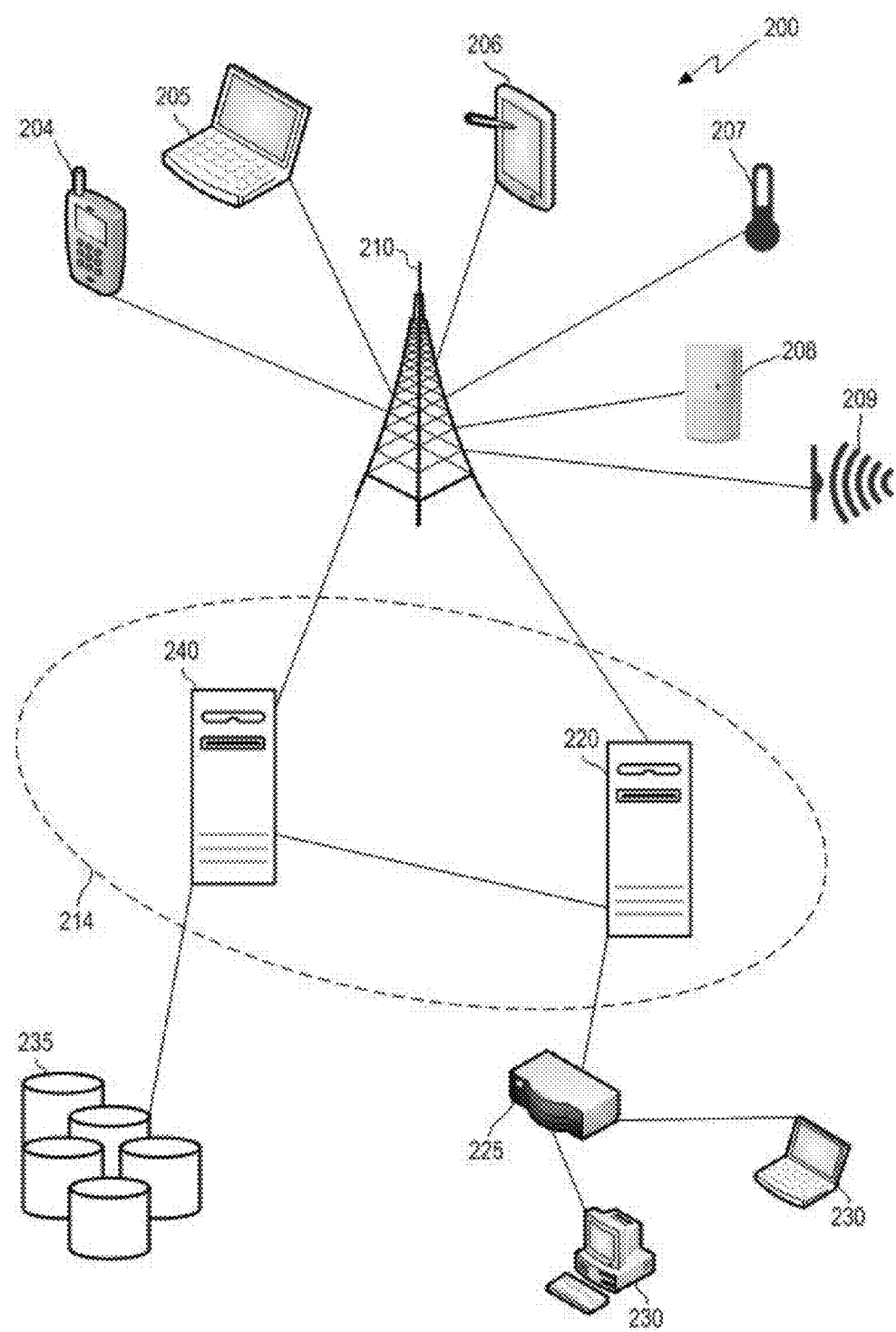
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include noncanonical information. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can transform data that includes noncanonical information into a canonical format before transmitting the data to the computing environment 214 for further processing (e.g., which can include applying big data analytics or textual analysis to the data).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which textual analysis is performed on one or more electronic communications, the computing environment 214 can perform pre-analysis of the one or more electronic communications. The pre-analysis can include normalizing the electronic communications by converting one or more noncanonical words in an electronic communication into a canonical version of the noncanonical word. The computing environment 214 can determine the canonical version of the noncanonical word at least in part by using neural networks.

Figure 3:
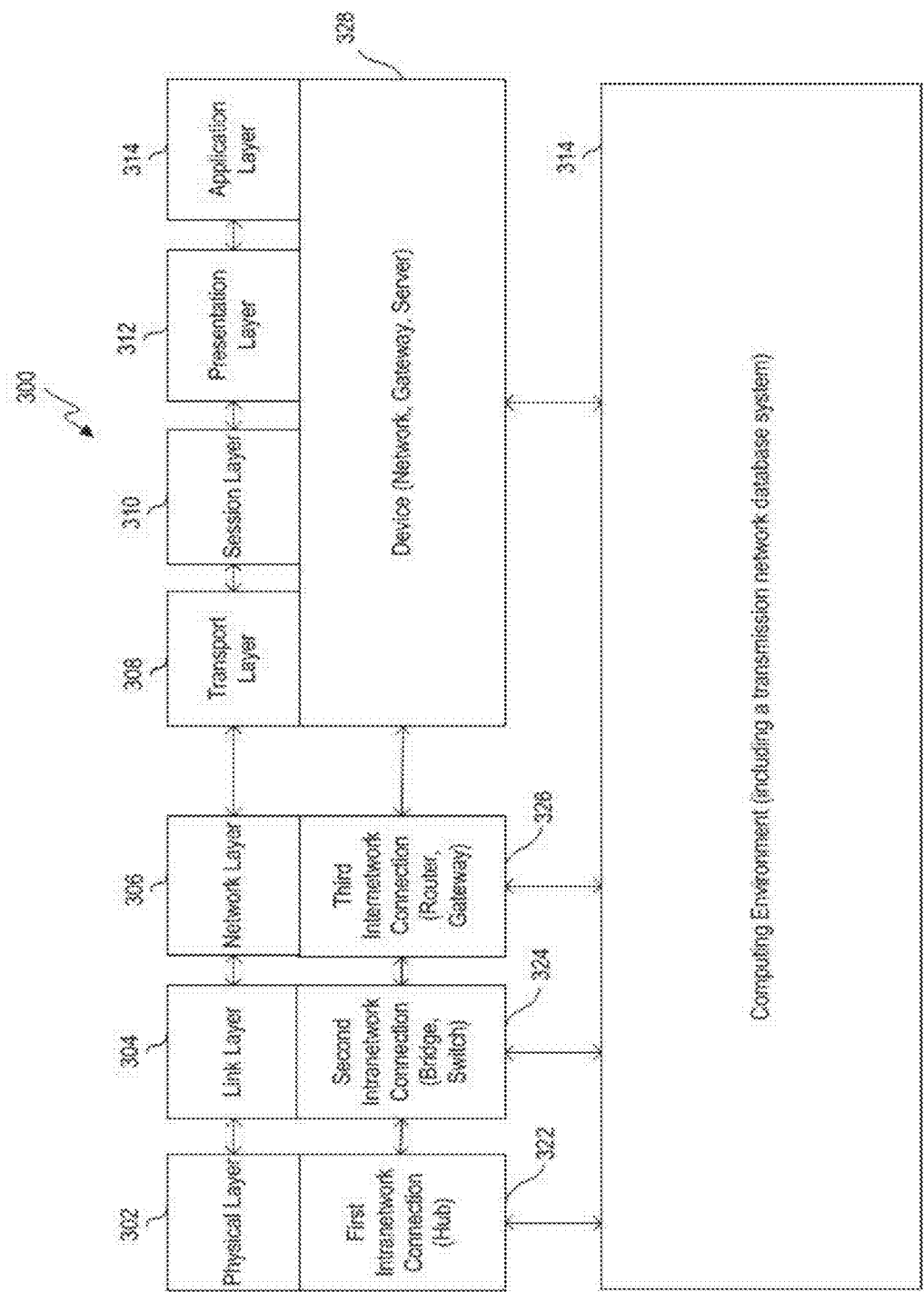
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes noncanonical information to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as a textual analysis application, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control devices from which it can receive data from. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for normalizing electronic communications using neural networks.

Figure 4:
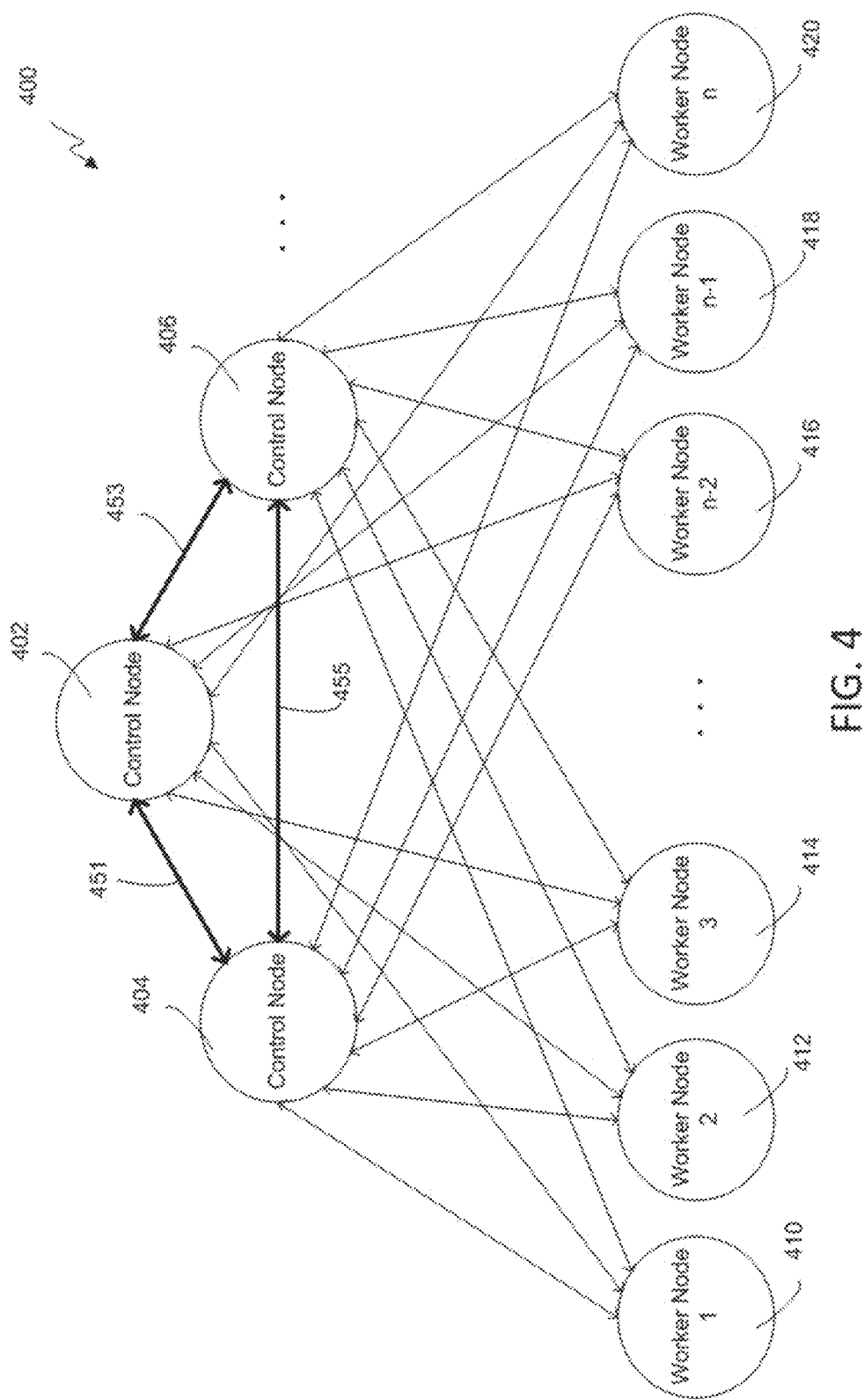
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes 402-406 are communicatively connected via communication paths 451, 453, and 455. The control nodes may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a textual analysis job being performed or an individual task within a textual analysis job being performed by that worker node. In some examples, worker nodes may not be connected (communicatively or otherwise) to certain other worker nodes. For example, a worker node 410 may only be able to communicate with a particular control node 404. The worker node 410 may be unable to communicate with other worker nodes 412-420 in the communications grid, even if the other worker nodes 412-420 are controlled by the same control node 404.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a textual analysis project or a normalization project for transforming a noncanonical communication into a canonical form. The project may include a data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for normalizing an electronic communication using neural networks can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 402 may perform analysis or normalization on a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 404, 406 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, electronic communications can be normalized using such a communications grid computing system 400.

Figure 5:
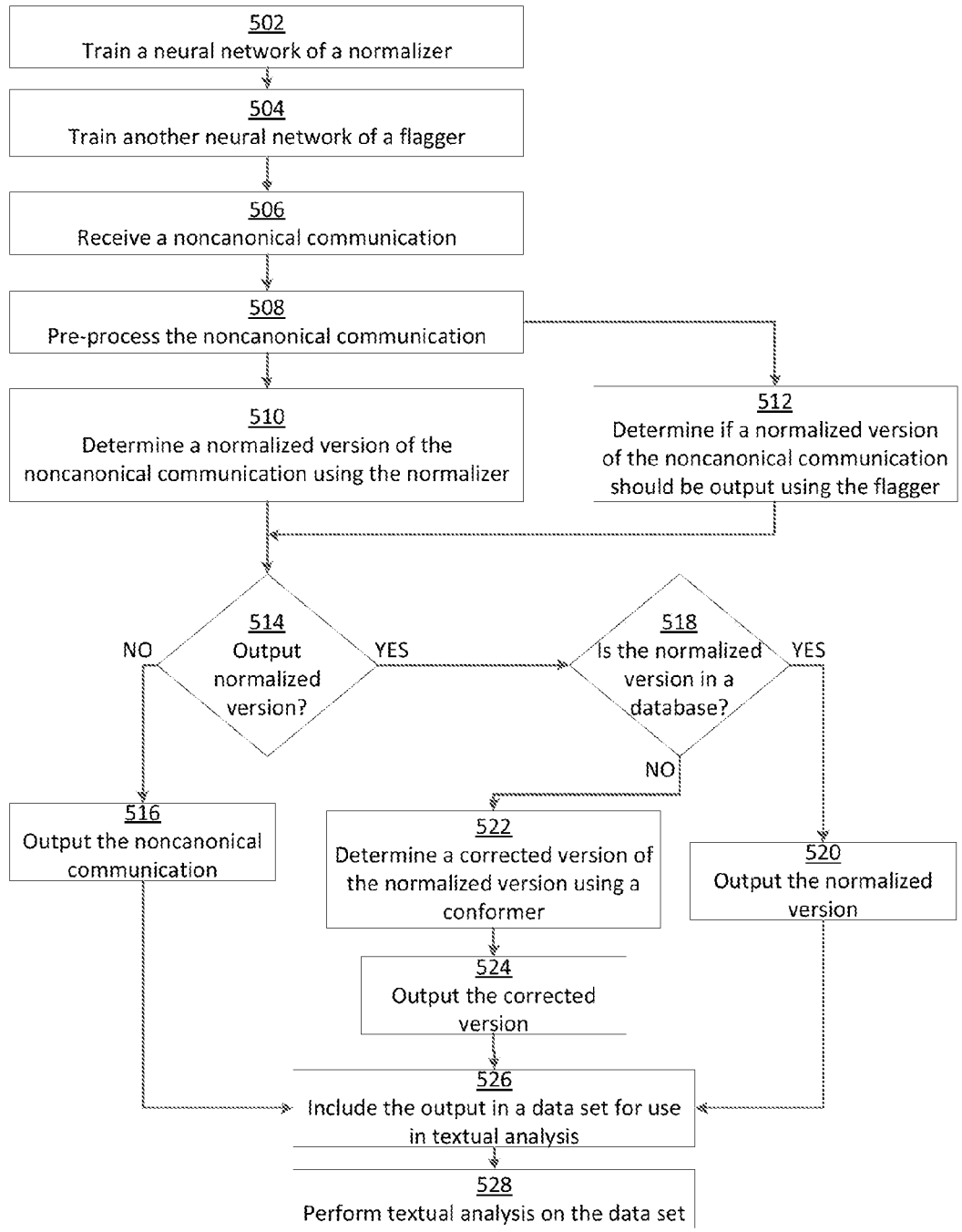
FIG. 5 is a flow chart of an example of a process for normalizing electronic communications using neural networks according to some aspects.

FIG. 5 is a flow chart of an example of a process for normalizing electronic communications using neural networks according to some aspects. Some examples can be implemented using any of the systems and configurations described with respect to FIGS. 1-4.

In block 502, a processor trains a neural network of a normalizer. The neural network can include one or more computer-implemented algorithms or models. Typically, neural networks can be represented as one or more layers of interconnected "neurons" that can exchange data between one another. The connections between the neurons can have numeric weights that can be tuned based on experience. Such tuning can make neural networks adaptive and capable of "learning." Tuning the numeric weights can increase the accuracy of output provided by the neural network.

The numeric weights can be tuned through a process referred to as training. In some examples, the processor can train the neural network using training data. The processor can provide the training data to the neural network, and the neural network can use the training data to tune one or more numeric weights of the neural network. In some examples, the neural network can be trained using backpropagation. Backpropagation can include determining a gradient of a particular numeric weight based on a difference between an actual output of the neural network and a desired output of the neural network. Based on the gradient, one or more numeric weights of the neural network can be updated to reduce the difference, thereby increasing the accuracy of the neural network. This process can be repeated to train the neural network. For example, this process can be repeated 150 or more times to train the neural network.

In some examples, training the neural network includes minimizing a difference between a result from the neural network and a desired result. The difference can be referred to as the cost. The cost can be determined according to the following equation:

$$\text{cost} = -\sum_{i=0}^{P} \log_e(p_i)$$

where p is a vector of probabilities for each letter in the desired result and P is a number of dimensions in the vector. The neural network can determine the cost between a result from the neural network and a desired result and back propagate to reduce the cost. For example, a noncanonical term "u" (an erroneous version of the word "you") can be input into the neural network. During training, the neural network can determine that the letter "y" is 75% likely for a first character in the desired result, the letter "o" is 95% likely for a second character in the desired result, and the letter "u" is 89% likely for a third character in the desired result. A negative log likelihood for each letter can be determined to be (0.29, 0.5, 0.12). The negative log likelihoods can be summed together to determine the cost, which can be back propagated through the neural network to train the numeric weights.

In some examples, the neural network is, or includes, a deep neural network. A deep neural network can include a neural network having one or more hidden layers of units ("neurons") between an input layer and an output layer of the neural network. Such layers between the input layer and the output layer may be referred to as "hidden" because they may not be directly observable in the normal functioning of the neural network. A deep neural network can include any number of hidden layers, and each hidden layer can include any number of neurons.

In some examples, the neural network includes a feed forward network. A feed forward network can include a neural network in which every neuron of the neural network only propagates an output value to a subsequent layer of the neural network. For example, data may only move one direction (forward) from one neuron to the next neuron in a feed forward network. A feed forward network can be distinguished from a recurrent neural network, which can include one or more feedback loops, allowing data to propagate in both forward and backward through the neural network.

Figure 7:
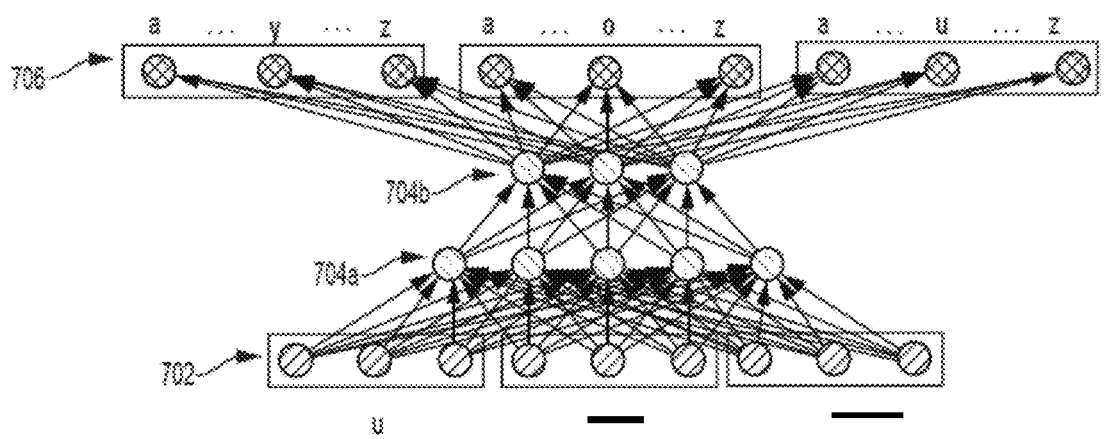
FIG. 7 is a model of an example of a neural network usable with a normalizer according to some aspects.

In some examples, the neural network includes a deep feed-forward network, which can combine the above-mentioned features. For example, the deep feed-forward network can include one or more hidden layers of neurons, in which the neurons only propagate data in a forward direction through the neural network. An example of the neural network of the normalizer is depicted in FIG. 7, and described in greater detail below.

In some examples, the neural network can receive a vector of numbers from one neural network layer, transform the vector of numbers using a matrix of numeric weights and/or a nonlinearity into a new vector of numbers, and provide the new vector of numbers to a subsequent layer of the neural network. Each subsequent layer of the neural network can repeat this process until the neural network outputs a final result.

For example, the neural network can receive a vector of numbers as an input at an input layer. The neural network can multiply the vector of numbers by a matrix of numeric weights to determine a weighted vector. The matrix of numeric weights can be tuned during the training of the neural network. The neural network can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer in the neural network. The subsequent layer of the neural network can receive the transformed output, multiply the transformed output by a matrix of numeric weights and a nonlinearity, and provide the result to yet another layer of the neural network. This process continues until the neural network outputs a final result.

In block 504, the processor trains another neural network of a flagger. The neural network of the flagger can be a separate neural network from the neural network of the normalizer. In some examples, the neural network of the flagger can be trained separately from the neural network of the normalizer.

Figure 12:
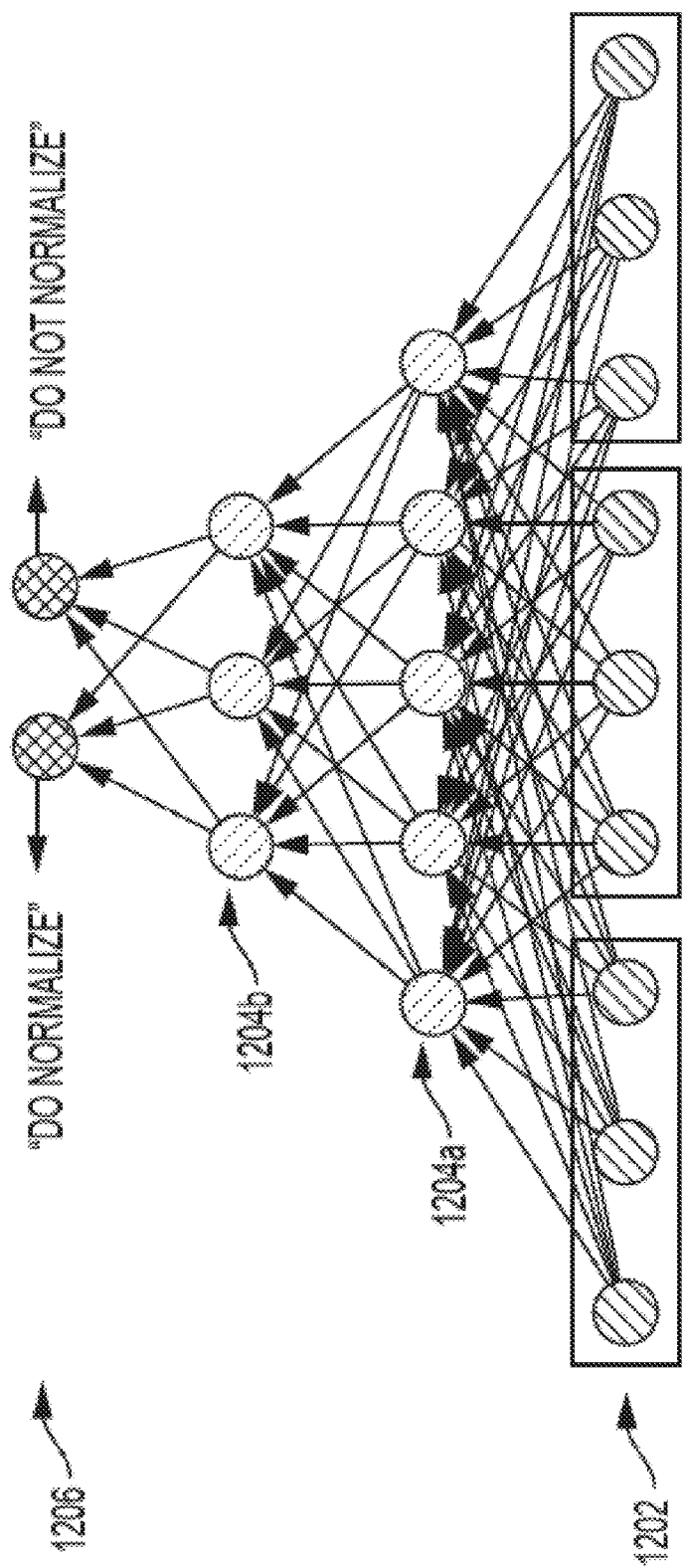
FIG. 12 is a model of an example of a neural network usable with a flagger according to some aspects.

The neural network of the flagger can include a deep neural network, a feed-forward neural network, or a deep feed-forward neural network. In some examples, the neural network of the flagger can be configured substantially the same as the neural network of the normalizer. An example of the neural network of the flagger is depicted in FIG. 12 and described in greater detail below.

The processor can train the neural network of the flagger by providing training data to the neural network of the flagger. The training data can be different from the training data used to train the neural network of the normalizer. The neural network can receive the training data and use the training data to tune one or more numeric weights of the neural network. The neural network of the flagger can be trained using any of the methods discussed above with respect to block 502.

In block 506, the processor receives a noncanonical communication. The noncanonical communication can include one or more words that are in a noncanonical form. As discussed above, a word can be in a noncanonical form if the word is misspelled according to an accepted and standardized spelling of the word; does not comport with one or more standardized grammatical rules; or both. A shorthand version of a word, a misspelled version of the word, or a grammatically incorrect version of the word can be examples of noncanonical forms of the word.

The processor can receive the noncanonical communication in an electronic form. For example, the processor can receive an electronic representation of the noncanonical communication over a network. In some examples, the noncanonical communication can include data from a forum post, a text message, an e-mail, a social media post (e.g., a Twitter™ tweet or a Facebook™ post), a blog post, an online review, text translated from speech, an electronic document, or any combination of these.

In block 508, the processor pre-processes the noncanonical communication. In some examples, the processor can pre-process the noncanonical communication by performing one or more steps shown in FIG. 6.

Figure 6:
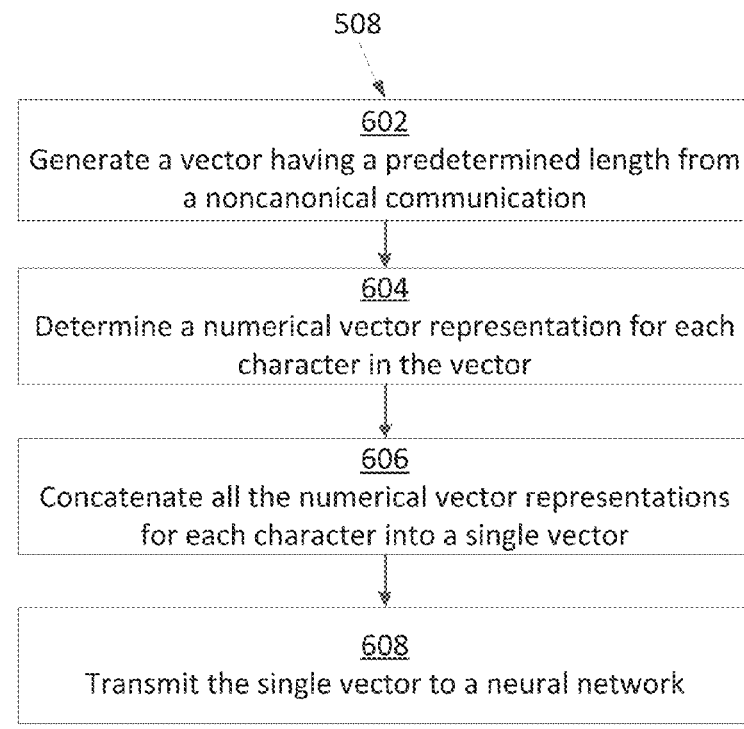
FIG. 6 is a flow chart of an example of a process for pre-processing a noncanonical communication according to some aspects.

Referring to FIG. 6, in block 602, the processor generates a vector having a predetermined length from the noncanonical communication. The vector can include the characters in the noncanonical communication. In some examples, the processor can include one or more padding characters (e.g., at the end of the vector) to extend a length of the vector to the predetermined length. For example, if the noncanonical communication is "u" (an erroneous version of the word "you") and the predetermined length is one, the processor can generate the vector [u]. If the noncanonical communication is "u" and the predetermined length is three, the processor can generate the vector [u, _], where "_" is a padding character for extending the length of the vector. In some examples, padding the vector can help ensure that, regardless of the length of the noncanonical communication, the vector is always the same length. This can reduce errors that can result if, for example, a neural network that will use the vector requires an input vector of a specific length.

In some examples, if a number of characters in the noncanonical communication exceeds the predetermined length, each character beyond the predetermined length may not be included in the vector. For example, if the noncanonical communication is "hellop" (an erroneous form of the word "hello") and the predetermined length is four characters, the processor may generate the vector [h, e, l, l]. In some examples, the predetermined length can be selected such that the vector is long enough to include most words. For example, the predetermined length can be 25 characters, which can be long enough to encompass most words in the English language. This can reduce the chance of characters being cut from or not included in the vector.

In block 604, the processor determines a numerical vector representation for each character in the vector of block 602. The numerical vector representation can include at least two components. Each component can be a floating-point number. For example, the vector representation for the letter "u" can be [0.1, −1.2, −0.3]. The vector representation for the padding character "_" can be [1.3, 0.0, −1,1]. In some examples, by representing a character as a vector of numbers, more information can be associated with the character than using other techniques. For example, representing a character as a vector of numbers can allow for more information to be associated with the character than using a numeric index, in which the character is represented by a single number (e.g., the letter "u" is represented by 21).

In some examples, the processor can use the normalizer to determine the numerical vector representation of a character in the noncanonical communication. The normalizer can learn the numerical vector representation of the character during training and provide the numerical vector representation to the processor. For example, the normalizer can determine that a numerical vector representation of the letter "u" is [0.1, −1.2, −0.3] and provide the numerical vector representation to the processor.

In some examples, the processor can use the flagger to determine the numerical vector representation of a character in the noncanonical communication. The flagger can learn the numerical vector representation of the character during training and provide the numerical vector representation to the processor. For example, the flagger can determine that a numerical vector representation of the letter "u" is [0.3, −1.4, −0.7] and provide the numerical vector representation to the processor.

In block 606, the processor concatenates all of the numerical vector representations for each character into a single vector. For example, the processor can concatenate the numerical vector representation of "u" (e.g., [0.1, −1.2, −0.3]) with the numerical vector representation of "_" (e.g., [1.3, 0.0, −1,1]) twice into a single vector: [0.1, −1.2, −0.3, 1.3, 0.0, −1,1, 1.3, 0.0, −1,1] representative of the vector [u, _, _]. The single vector can be longer than a numerical vector representation for a particular character. For example, the single vector can be nine floating-point numbers long, while a numerical vector representation for a particular character can be three floating-point numbers long.

In block 608, the processor transmits the single vector to a neural network. The neural network can be the neural network of the normalizer or the neural network of the flagger. In an example where the processor determined the numerical vector representations using the normalizer, the processor can transmit the single vector to the normalizer. The neural network of the normalizer can use the single vector as an input at an input layer. In an example where the processor determined the numerical vector representations using the flagger, the processor can transmit the single vector to the flagger. The neural network of the flagger can use the single vector as an input at an input layer.

In block 510 of FIG. 5, the processor can determine a normalized version of the noncanonical communication using the normalizer. As discussed above, the normalizer can include a neural network. In some examples, the neural network of the normalizer can be represented as depicted in FIG. 7. The neural network can determine the normalized version of the noncanonical communication according to the operations shown in FIG. 8.

Figure 8:
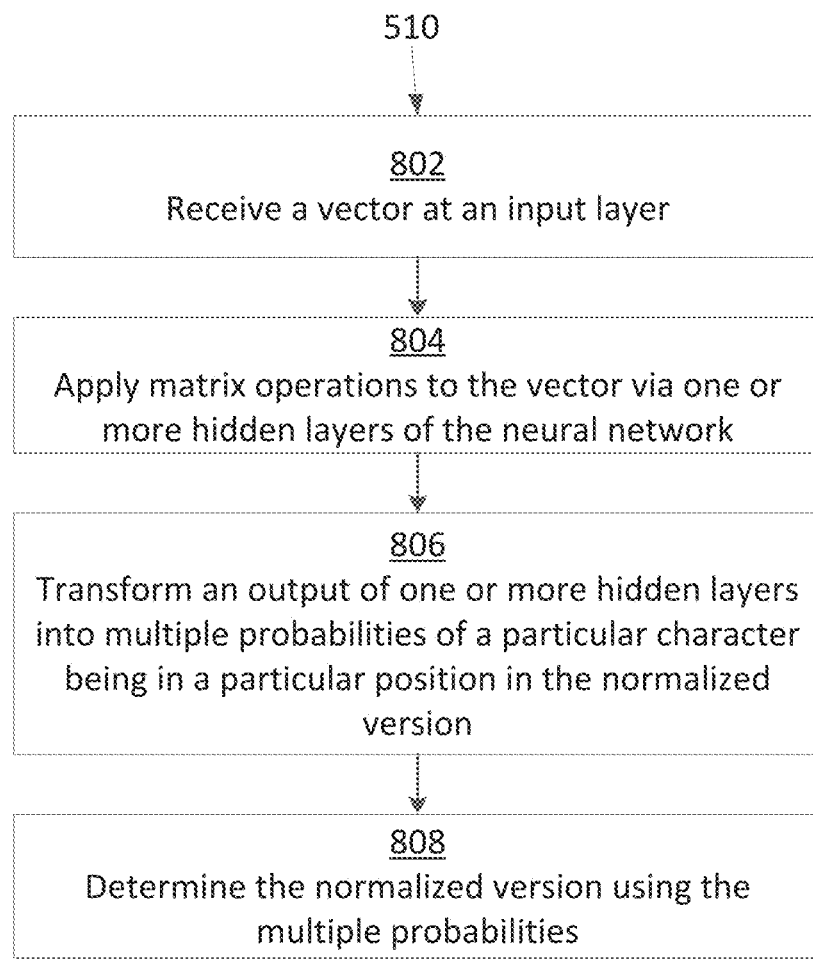
FIG. 8 is a flow chart of an example of a process for determining a normalized version of a noncanonical communication according to some aspects.

Referring to FIGS. 7-8 together, in block 802, the neural network can receive a vector at an input layer 702. For example, the neural network can receive a vector of numbers representative of the vector [u, _, _] at the input layer 702. In some examples, the vector can be a single vector generated according to the process described with respect to FIG. 6.

In block 804, the neural network applies matrix operations to the vector via one or more hidden layers 704*a-b* of the neural network. The neural network can include any number of hidden layers 704*a-b*. Each hidden layer 704*a-b* can include any number of neurons. In some examples, the neural network includes two hidden layers 704*a-b*, with each hidden layer 704*a-b* including 2000 neurons.

In block 806, the neural network transforms an output vector from a hidden layer 704*b* into multiple probabilities of particular characters being in particular positions in a normalized version of the noncanonical communication.

Figure 9:
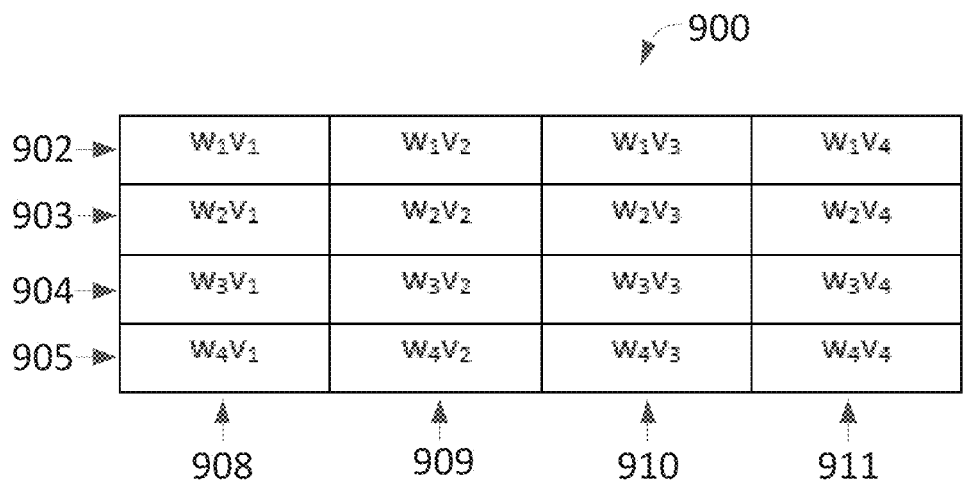
FIG. 9 is an example of a w*v matrix, where w=4 and v=4 according to some aspects.

For example, the neural network can include output layer 706. The output layer 706 can receive an output vector from hidden layer 704b. The output layer 706 can apply a matrix operation, such as a matrix multiplication, to the output vector to generate a resulting matrix of values. The resulting matrix can be w*v in size, where w is a length of the input vector and v is a total number of all possible character options (including the padding character). An example of the resulting w*v matrix 900, where w=4 and v=4, is depicted in FIG. 9. In FIG. 9, $w_x v_y$ can represent a floating-point number associated with a particular character ($v_y$) being in a particular position ($w_y$) in a normalized version of the noncanonical communication. For example, each row 902-905 of the w*v matrix 900 can be associated with a particular position in the normalized version of the noncanonical communication. Each column 908-911 of the w*v matrix 900 can be associated with a particular character. FIG. 10 is an example of a matrix 1000 in which the variables of FIG. 9 are shown as their respective floating-point numbers according to some aspects. Each row 1002-1005 of the matrix 1000 can be associated with a particular position in the normalized version of the noncanonical communication. Each column 1008-1011 of the matrix 1000 can be associated with a particular character. For example, the floating-point number "1.7" in position $w_3 v_2$ can be associated with character $v_2$ being in position $w_3$ in the normalized version of the noncanonical communication. While FIG. 9 depicts a four by four matrix (e.g., w=4 and v=4) for simplicity, in other examples, w and v can be larger or smaller numbers and can be different from one another. For example, v can be 95 characters or more. Thus, in some examples, the resulting matrix can be larger or smaller.

The floating-point numbers in the resulting matrix may not be usable in their raw form. For example, referring to FIG. 10, the number "0.7" in position $w_1 v_4$ may not be directly usable to determine a normalized version of the noncanonical communication. In some examples, the output layer 706 can transform the floating-point numbers in the resulting matrix into probabilities. For example, the output layer 706 can transform the floating-point number associated with each $w_x v_y$ value in FIG. 10 into a probability. Each of the probabilities can represent a likelihood of character $v_y$ being in position $w_x$ in a normalized version of the noncanonical communication.

The output layer 706 can transform the resulting matrix into the multiple probabilities by performing a nonlinear transformation. The nonlinear transformation can include a softmax operation. In some examples, the softmax operation can transform each value in a row of the resulting matrix (or each value in a column of the resulting matrix, depending on the configuration of the matrix) into a value between zero and one, where the total of all of the values in the row (or column) sums to one. In some examples, the softmax operation can be implemented using the following equation:

$$\sigma(z)_j = \frac{e^{z_j}}{\sum_{k=1}^{K} e^{z_k}} \text{ for } j = 1, \ldots, K$$

where $\sigma(z)_j$ is K-dimensional vector of real values in the range from 0 to 1, z is an input vector, k is a value in the vector, and K is a number of dimensions in the matrix. FIG. 11 is an example of a matrix 1100 including the multiple probabilities according to some aspects. As shown in FIG. 11, for each row 1102-1105, all of the numbers in the row sum to one. For example, in row 1102, the numbers (probabilities) 0.40, 0.10, 0.26, and 0.24 sum to one.

In block 808, the neural network determines a normalized version using the multiple probabilities. For example, the neural network can determine a highest probability associated with each row in the probability matrix. For instance, referring to FIG. 11, the neural network can determine that the highest probability in row 1103 is 0.30 (e.g., 30%). In some examples, the neural network can determine a character associated with the highest probability by mapping a position of the highest probability in the probability matrix to the character. For example, each column 1108-1111 in the probability matrix 1100 can correspond to a particular character. Based on the column in which the highest probability is positioned, the neural network can select the corresponding character. In one example, the neural network can determine that the character associated with 0.30 is the letter "o," because 0.30 is in column 1111 of the probability matrix 1100, and column 1111 can be mapped to the letter "o."

In some examples, each row 1102-1105 in the probability matrix 1100 can correspond to a particular position within the normalized version of the noncanonical communication. For example, row 1102 can correspond to the first letter in the normalized version of the noncanonical communication, row 1103 can correspond to the second letter in the normalized version of the noncanonical communication, etc. The neural network can therefore determine a position for the character in the noncanonical communication based on a row 1102-1105 in which the highest probability is positioned. For example, the neural network can determine that the letter "o" is the second letter in the normalized version of the noncanonical communication, because the letter "o" is in the second row 1103 of the probability matrix.

The neural network can repeat the above processes until the neural network determines all of the letters, and positions for all of the letters, in the normalized version of the noncanonical communication. The neural network can arrange the determined letters in their determined order (e.g., positions) to generate the normalized version of the noncanonical communication.

Although in the above discussion, the columns 1108-1111 in the probability matrix 1100 correspond to characters and the rows 1102-1105 in the probability matrix 1100 correspond to the positions of the characters in the normalized version of the noncanonical communication, numerous other mapping schemes may be possible. For example, an opposite configuration may be possible, in which the rows 1102-1105 of the probability matrix 1100 can correspond to characters and the columns 1108-1111 in the probability matrix 1100 can correspond to the positions of the characters in the normalized version of the noncanonical communication.

Referring back to FIG. 5, in block 512, the processor determines if a normalized version of the noncanonical communication should be output using the flagger. The flagger can include a neural network. In some examples, the neural network of the flagger can be represented as depicted in FIG. 12. The neural network of the flagger can determine if a normalized version of the noncanonical communication should be output according to the steps shown in FIG. 13.

Figure 13:
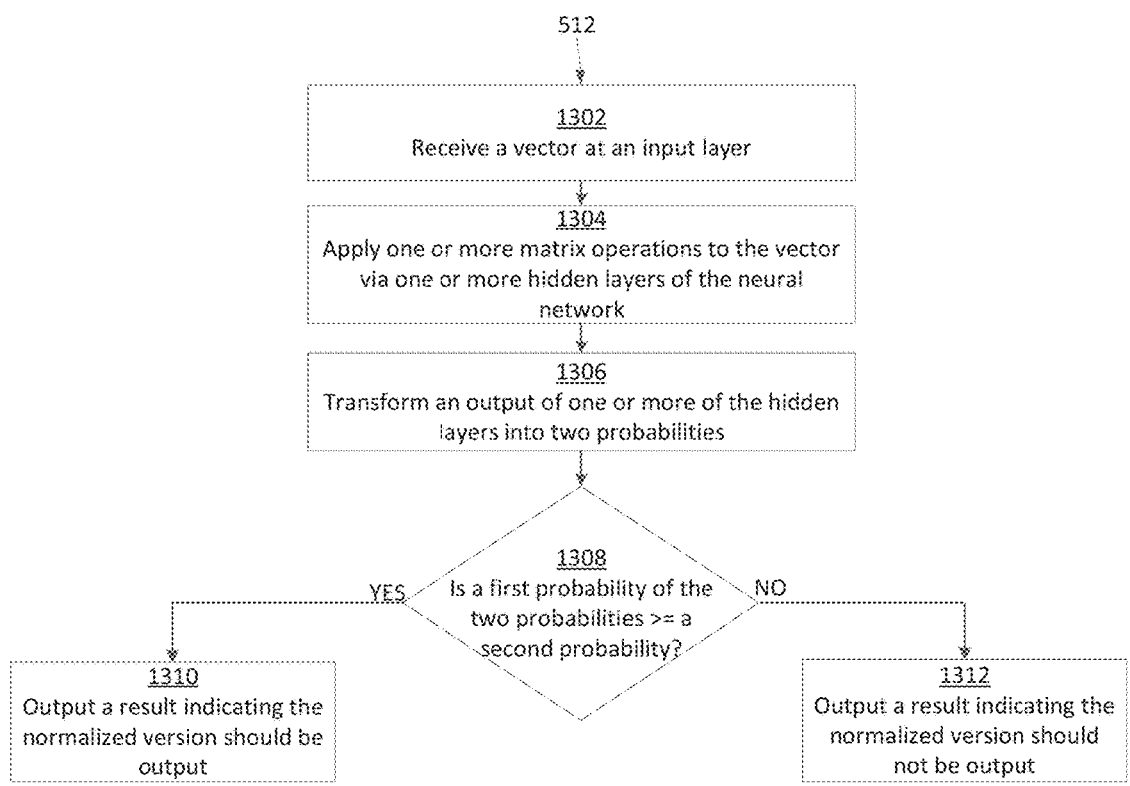
FIG. 13 is a flow chart of an example of a process for determining if a normalized version of a noncanonical communication should be output according to some aspects.

Referring to FIGS. 12-13 together, in block 1302, the neural network can receive a vector at an input layer 1202. For example, the neural network can receive a vector of numbers representative of the vector [u, _, _] at the input layer 1202. In some examples, the vector of numbers can include the single vector generated according to the process described with respect to FIG. 6.

In block 1304, the neural network applies matrix operations to the vector via one or more hidden layers 1204*a-b* of the neural network. The neural network can include any number of hidden layers 1204*a-b*. Each hidden layer 1204*a-b* can include any number of neurons. In some examples, the neural network includes two hidden layers 1204*a-b*, with each hidden layer 1204*a-b* including 1000 neurons.

In block 1306, the neural network transforms an output vector from a hidden layer 1204*b* into two probabilities. One probability can indicate a likelihood that a normalized version of the noncanonical communication (e.g., as determined by the normalizer) should be output. The other probability can indicate a likelihood that a normalized version of the noncanonical communication should not be output.

For example, the neural network can include output layer 1206. The output layer 1206 can receive an output vector from hidden layer 1204*b*. The output layer 1206 can include two neurons. One neuron can indicate a raw value associated with a likelihood that a normalized version of the noncanonical communication should be output. The other neuron can indicate a raw value associated with a likelihood that a normalized version of the noncanonical communication should not be output.

The raw values may not be usable in their raw form. For example, the raw value indicated by a neuron may not be directly usable to determine if a normalized version of the noncanonical communication should be output. In some examples, the output layer 1206 can transform the raw values into probabilities. The output layer 1206 can transform the raw values into probabilities by performing a nonlinear transformation. The nonlinear transformation can include a softmax operation. For example, the output layer 1206 can use a softmax operation to transform a raw value from one neuron into a probability of 46% and another raw value from another neuron into another probability of 54%.

In block 1308, the neural network can determine if a first probability of the two probabilities is greater than or equal to a second probability of the two probabilities. For example, the neural network can determine if the probability of 46% is greater than or equal to the probability of 54%. If the neural network determines that the first probability is greater than or equal to the second probability, the process can proceed to block 1310. In block 1310, the neural network can output a result indicating that the normalized version of the noncanonical communication should be output. If the neural network determines that the first probability is less than the second probability, the process can proceed to block 1312. In block 1312, the neural network can output a result indicating that the normalized version of the noncanonical communication should not be output.

In some examples, the noncanonical communication can actually be correct or in a desired format. Thus, the flagger can determine that the noncanonical communication should be output. In other examples, the noncanonical communication can include one or more special features. For example, the noncanonical communication can include a hashtag, a foreign word, a uniform resource locator (url), or other special data. The flagger can detect such special features and determine such noncanonical communications are in a protected category. If the noncanonical communication falls within a protected category, the flagger can determine that the noncanonical communication itself should be output. This can prevent the "correction" of noncanonical communications that may not need to be corrected or may be incorrect if corrected, such as with URLs.

Returning to FIG. 5, in some examples, the steps of block 510 and 512 can occur substantially simultaneously (e.g., in parallel to another). For example, the normalizer can determine the normalized version of the noncanonical communication substantially simultaneously to the flagger determining whether the normalized version of the noncanonical communication should be output. While it may seem inefficient to always determine the normalized version of the noncanonical communication, even if the normalized version is not used (e.g., due to the result from the flagger), this can allow the normalizer to be run in parallel with the flagger on many inputs simultaneously using optimized matrix operations, which can improve processing speeds.

In block 514, the processor determines if the normalized version of the noncanonical communication should be output. The processor can determine if the normalized version of the noncanonical communication should be output based on a result from the flagger (e.g., as determined in block 512). If the processor determines that the normalized version should not be output, the process can proceed to block 516. Otherwise, the process can proceed to block 518.

In block 516, the processor outputs the noncanonical communication. For example, the processor can determine that the noncanonical communication should be used as the normalized version of the noncanonical communication and output the noncanonical communication.

In block 518, the processor determines if the normalized version of the noncanonical communication is in a database. In some examples, the database can include a dictionary or another database of known terms. The processor can access the database to determine if the normalized version of the noncanonical communication (e.g., as determined in block 510) is within the database. If the processor determines that the normalized version of the noncanonical communication is in the database, the process can proceed to block 520. Otherwise, the process can proceed to block 522.

In block 520, the processor outputs the normalized version of the noncanonical communication (e.g., as determined in block 510).

In block 522, the processor determines a corrected version of the normalized version of the noncanonical communication using a conformer. The conformer can account for small errors in the normalized version of the noncanonical communication. For example, the conformer can transform the term "laugling," which may be the normalized version of the noncanonical communication, to the correct word "laughing." In some examples, the conformer can correct for normalized versions of noncanonical communications that are too long to be determined by the normalizer. For example, the acronym "rofl" can stand for multiple words (rolling on the floor laughing) that total to 29 characters. If the normalizer can only predict the first 27 characters, the conformer can select the correct version. In some examples, the conformer can include one or more modules (e.g., memory modules) storing processor executable instructions. The instructions can cause the processor to perform the steps shown in FIG. 14 in some examples.

Figure 14:
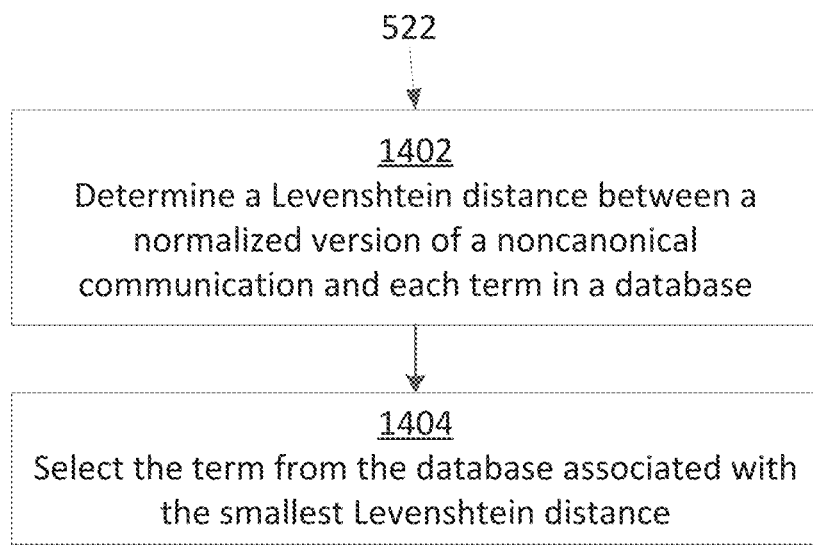
FIG. 14 is a flow chart of an example of a process for determining a corrected version of a normalized version of a noncanonical communication should be output according to some aspects.

Referring to FIG. 14, in block 1402, the processor determines a Levenshtein distance between the normalized version of the noncanonical communication and each term in the database. The Levenshtein distance can represent how similar two terms are to one another. For example, the Levenshtein distance can indicate a minimum number of single-character edits required to change one term into the other term.

In block 1404, the processor selects the term in the database associated with the smallest Levenshtein distance. For example, if a first term in the database is associated with a Levenshtein distance of two, and a second term in the database is associated with a Levenshtein distance of four, the processor can select the first term. In some examples, if two terms in the database are associated with the same Levenshtein distance, the processor can select whichever term comes first in the database. The processor can use the selected term as the corrected version of the normalized version of the noncanonical communication.

Returning to FIG. 5, in block 524, the processor outputs the corrected version of the normalized version of the noncanonical communication. In some examples, the operations of blocks 518-524 of FIG. 5, blocks 1402-1404 of FIG. 14, or both can be performed by a conformer.

In block 526, the processor can include the output in a data set. The data set can be usable for textual analysis. For example, the data set can be configured to be analyzed to detect one or more characteristics or trends associated with the data set. In one example, the processor can include the output in a data set that includes multiple Twitter™ tweets. The data set can be analyzed using a textual analysis program to determine a customer sentiment about a brand indicated by the Twitter™ tweets.

In block 528, the processor performs textual analysis on the data set. For example, the processor can use a textual analysis program (e.g., stored in memory) to analyze one or more characteristics of the data set to determine a trend, pattern, or other information indicated by the data set. The processor can provide such information to a user. Examples of such information can include a sentiment, such as a user sentiment about a brand; an emotion, such as an emotion tied to a particular product launch; a statistic, such as a number of times a user posted about a particular product; etc.

Figure 15:
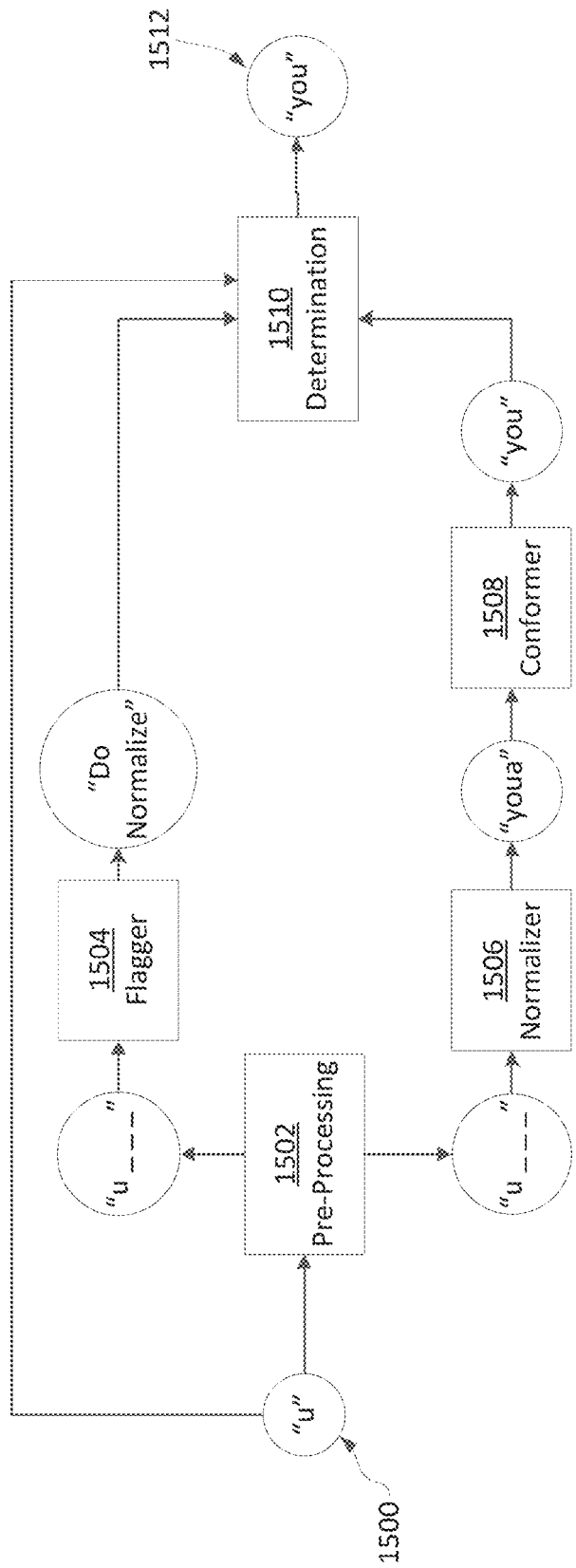
FIG. 15 is a data flow diagram of an example of a noncanonical electronic communication normalized using neural networks according to some aspects.

FIG. 15 is a data flow diagram of an example of a noncanonical electronic communication being normalized using neural networks according to some aspects. As shown in FIG. 15, a noncanonical communication 1500 can be the letter "u." The noncanonical communication can be transmitted through a pre-processing stage 1502, which can output a vector "u _ _ _." The vector can be four characters long and can include padding characters "_." The vector can be transmitted to the flagger 1504 and the normalizer 1506. In some examples, the flagger 1504 and the normalizer 1506 can perform their respective operations in parallel.

In the example shown in FIG. 15, the flagger 1504 determined that the noncanonical communication should be normalized. The normalizer 1506 determined that a normalized version of the noncanonical communication is "youa." The normalizer 1506 can transmit the normalized version of the noncanonical communication to a conformer 1508. In some examples, the conformer 1508 can determine that a corrected version of the normalized version of the noncanonical communication is "you."

In some examples, a result from the flagger 1504, a result from the conformer 1508, and the noncanonical communication itself can be used in a determination stage 1510. In the determination stage 1510, a processor can determine if the result from the conformer 1508, or the noncanonical communication itself, should be output based on the result from the flagger 1504. As shown in FIG. 15, due to the result from the flagger 1504 indicating that the noncanonical communication should be normalized, the processor has determined that the corrected version of the normalized version of the noncanonical communication (e.g., "you") should be output. Thus, the processor can output the corrected version 1512 of the normalized version of the noncanonical communication 1500. In some examples, if the processor determines that the corrected version of the normalized version of the noncanonical communication (e.g., "you") should not be output due to a different result from the flagger 1504, the processor can output the noncanonical communication 1500 itself.

Example of an Implementation

FIG. 16 is a table 1600 of parameters for an example of an implementation according to some aspects. As shown in FIG. 16, some examples can include a preprocessing vector length of 25 characters. The normalizer can include a neural network with two hidden layers, each layer including 2000 nodes, with a 50% dropout rate. A dropout rate can include a number or percentage of hidden nodes for each layer of a neural network randomly excluded from consideration during training. The flagger can include another neural network with two hidden layers, each layer including 1000 nodes, with a 75% dropout rate. In some examples, implementations with higher numbers of hidden layers, nodes, or both can have lower processing speeds and require more memory to implement.

In some examples, the training data for training the neural network of the normalizer and the neural network of the flagger can be separated into three data sets: a first data set, a second data set, and a third data set. The first data set can include 90% of the training data and can be used for training the neural network of the normalizer, the neural network of the flagger, or both. In some examples, the neural network of the normalizer, the neural network of the flagger, or both can be trained by iterating the training process (using the first data set) multiple times. For example, the neural network of the normalizer and the neural network of the flagger can be trained by iterating the training process hundreds or thousands of times. In some examples, the neural network of the normalizer and the neural network of the flagger can be trained by iterating the training process until there is minimal, or no, observable improvement in the results for a predetermined number of iterations (e.g., 150 iterations). The second data set can include 5% of the training data and can be used for validation of the system. The third data set can include 5% of the training data and can be used for testing the system. For example, data from the third data set can be provided to the trained normalizer and the trained flagger for normalization.

In some examples, special characters (e.g., "@," "#," and "http://") can be removed from the training data used to train the normalizer. This can reduce errors, because the normalizer may be unable to accurately handle such characters. Further, the flagger can detect such special characters and flag them as not to be corrected, thereby helping to ensure that such special characters are properly handled.

In some examples, layer-wise pre-training can be used to train a neural network (e.g., of the normalizer, the flagger, or both). In layer-wise pre-training, the neural network is first trained with zero hidden layers (e.g., going directly from an input layer to an output layer), then trained with one hidden layer, then trained with two hidden layers, etc. In some examples, training the neural network of the normalizer can take six hours or more. Training the neural network of the flagger can be substantially faster. For example, training the neural network of the flagger can take as little as a half hour.

Figure 17:
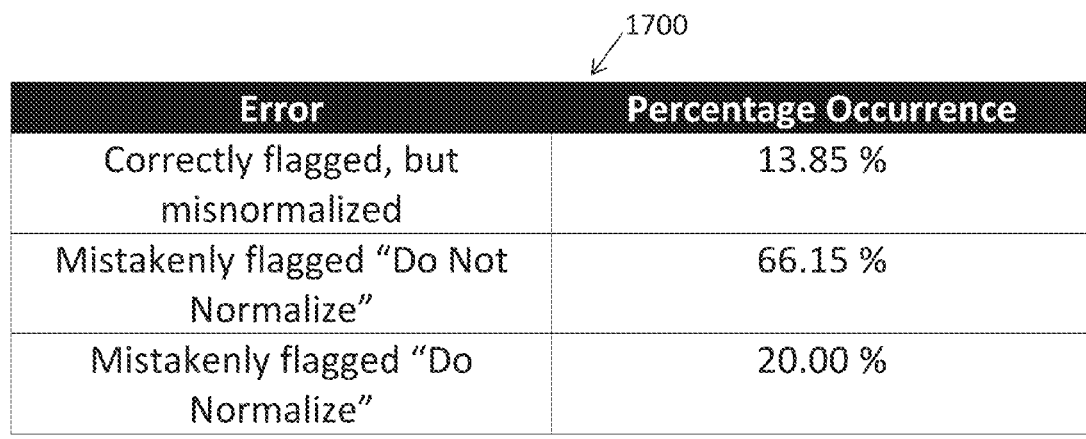
FIG. 17 is a table of an example of a breakdown of the causes of the 2-3% error rate according to some aspects.

Some examples can have an accuracy of 97.76% or more when using the validation data of the second data set, and an accuracy of 97.36% or more when using the test data of the third data set. For example, some examples can have an error rate of 2-3%. FIG. 17 is a table 1700 of an example of a breakdown of the causes of the 2-3% error rate according to some aspects. As shown in FIG. 17, 13.85% of the 2-3% error rate can be due to a noncanonical communication being correctly flagged but incorrectly normalized. Additionally, 66.15% of the 2-3% error rate can be due to a noncanonical communication being incorrectly flagged as "do not normalize." 20% of the 2-3% error rate can be due to a noncanonical communication being incorrectly flagged as "do normalize."

Figure 18:
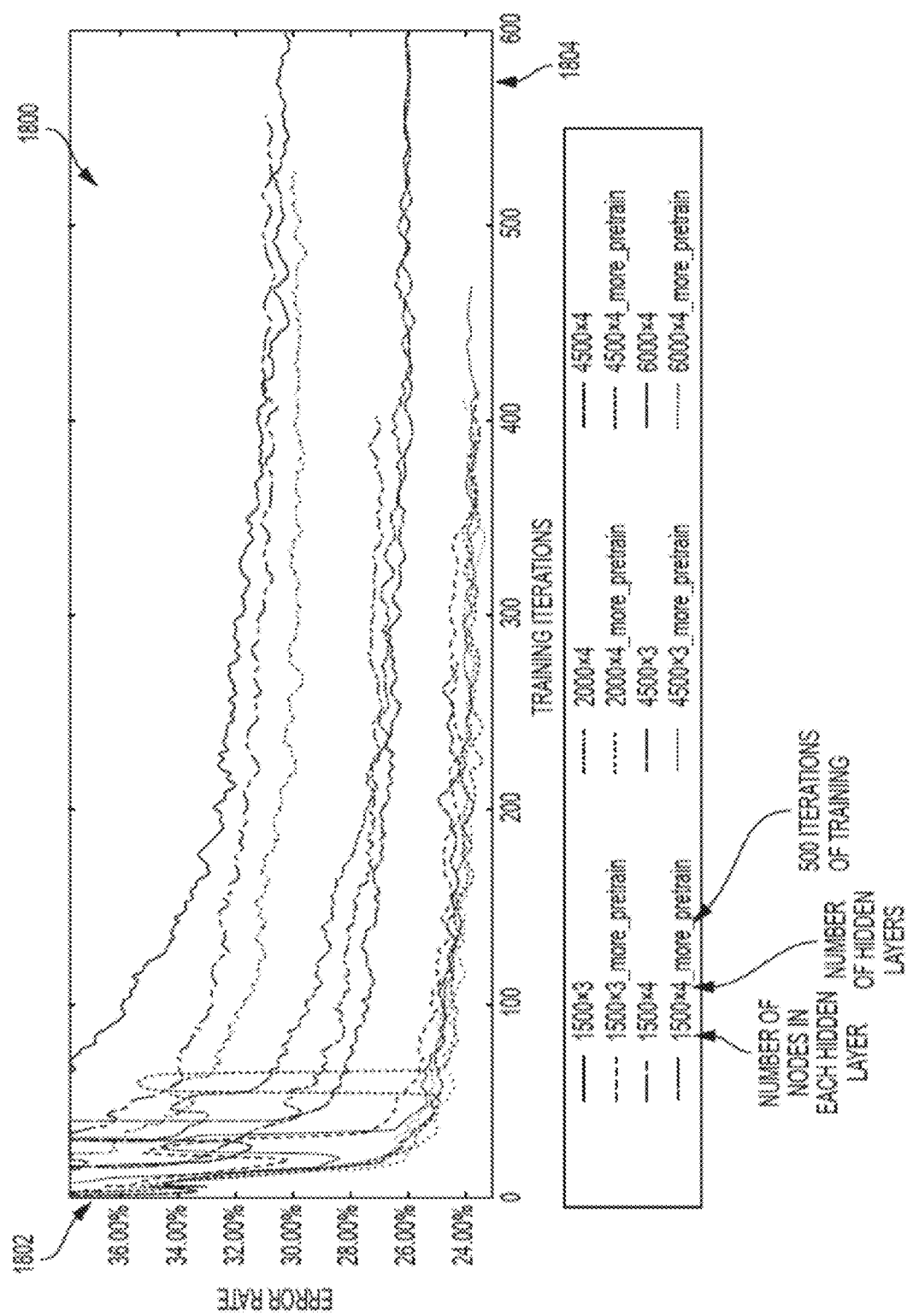
FIG. 18 is a graph of an example of normalization error rates for a system that does not include a conformer and a flagger according to some aspects.

Some examples may not include a conformer, the flagger, or both. Examples that do not include all three of the normalizer, the flagger, and the conformer can result in error rates of 24-38% or more. For example, FIG. 18 is a graph 1800 of an example of normalization error rates for a system that does not include a conformer and a flagger according to some aspects. The x-axis 1804 can represent a number of training iterations used to train the normalizer, and the y-axis 1802 can represent an error rate. In FIG. 18, labels are depicted in the format "LxN," where L is the number of nodes in each hidden layer in a neural network and N is the number of hidden layers in the neural network. Some labels include the term "more_pretrain" to indicate that pre-training of the neural network used 500 iterations rather than a default 250 iterations. As can be seen in FIG. 18, regardless of the number of nodes in each hidden layer, the number of hidden layers, and the number of training iterations, in some examples, performance can be significantly worse without the conformer and the flagger than with the conformer and the flagger (which, as discussed above, can have an error rate of 2-3%). Additionally, in some examples, the number of hidden layers, nodes, or both of the neural network of the normalizer needs to be dramatically increased (e.g., to 6000 nodes per hidden layer, with four hidden layers) to improve the results. But this can increase the computational complexity associated with the neural network, because more hidden layers, nodes, or both can result in the neural network needing to perform larger matrix operations. The increased computational complexity can significantly reduce processing speeds. Conversely, examples that include the conformer and the flagger can include a normalizer with a much smaller neural network (e.g., two hidden layers of 2000 nodes each). This is because the normalizer may not need to learn to normalize words handled by the flagger, the conformer, or both. The processing cost of including the conformer, the flagger, or both can be small compared to increasing the size of the neural network of the normalizer, and therefore including the conformer, the flagger, or both can improve overall processing speeds.

Some examples do not rely on a context of a noncanonical word (e.g., a noncanonical word) within a series of words to determine a normalized version of the noncanonical word. Thus, such examples can always determine the same normalized version of the noncanonical word, regardless of a position of the noncanonical word in a series of words. Further, some examples may not require labor-intensive hand-engineering of features (e.g., humans determining what features to use in training the various neural networks). Other examples can rely on the context of the noncanonical word within a series of words to determine a normalized version of the noncanonical word.

In some examples, normalizing the noncanonical communication by constructing the normalized form of the noncanonical communication (e.g., rather than selecting the normalized form from a list) can allow the system to normalize to a correct word that did not appear in the training data. Further, some examples can correct for syntax errors and other grammatical errors, in additional to word misspellings.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer readable medium comprising program code executable by a processor for causing the processor to:
    receive an electronic representation of a noncanonical communication;
    feed a vector that is representative of the noncanonical communication as input to a normalizer, wherein the normalizer is operable for implementing a first neural network to:
        receive the vector at an input layer of the first neural network,
        perform matrix operations on the vector using a plurality of hidden layers to generate hidden values,
        provide hidden values from a final hidden layer of the plurality of hidden layers to an output layer of the first neural network,
        perform, at the output layer, a softmax operation on the hidden values to generate a plurality of values representing probabilities of particular characters being in particular positions in a normalized version of the noncanonical communication, and
        determine the normalized version of the noncanonical communication based on the plurality of values, wherein the normalized version of the noncanonical communication is different from the noncanonical communication;
    feed the vector as input to a flagger for operating a second neural network that is trained separately from the first neural network;
    determine, based on a result from the flagger, that the normalized version of the noncanonical communication should be outputted; and
    output the normalized version of the noncanonical communication or a corrected version of the normalized version of the noncanonical communication, wherein the corrected version of the noncanonical communication is different from the noncanonical communication.

2. The non-transitory computer readable medium of claim 1, further comprising program code executable by the processor for causing the processor to:
    in response to determining that the normalized version of the noncanonical communication should be outputted based on the result from the flagger:
        output the normalized version of the noncanonical communication in response to determining that the normalized version of the noncanonical communication is present in a database; and
        output the corrected version of the normalized version of the noncanonical communication in response to determining that the normalized version of the noncanonical communication is not present in the database.

3. The non-transitory computer readable medium of claim 2, further comprising program code executable by the processor for causing the processor to:
determine the corrected version using a conformer, the conformer configured to:
determine a Levenshtein distance between the normalized version of the noncanonical communication and each word of a plurality of words in the database; and
select as the corrected version a word from the plurality of words in the database associated with a smallest Levenshtein distance.

4. The non-transitory computer readable medium of claim 1, further comprising program code executable by the processor for causing the processor to:
preprocess the noncanonical communication prior to determining the normalized version of the noncanonical communication by:
determining a plurality of vectors associated with the noncanonical communication by transforming each character in the noncanonical communication into a vector comprising a predetermined length; and
concatenating the plurality of vectors together into the vector, the vector comprising another predetermined length.

5. The non-transitory computer readable medium of claim 1, wherein each hidden layer of the plurality of hidden layers comprises a layer of units between the input layer and the output layer of the first neural network.

6. The non-transitory computer readable medium of claim 1, wherein the first neural network is configured so that every unit of the first neural network only propagates an output value to a subsequent layer of the first neural network.

7. The non-transitory computer readable medium of claim 1, wherein the input layer of the first neural network is a first input layer, the output layer of the first neural network is a first output layer, the softmax operation is a first softmax operation, and wherein the second neural network of the flagger is configured to:
receive the vector at a second input layer of the second neural network;
perform a plurality of matrix operations on the vector using at least two hidden layers of the second neural network to generate a plurality of hidden values, wherein each hidden layer of the at least two hidden layers comprises a layer of units between the second input layer and a second output layer of the second neural network;
provide one or more hidden values of the plurality of hidden values to the second output layer of the second neural network;
perform, at the second output layer, a second softmax operation on the one or more hidden values to generate a first value indicating a first probability that the normalized version of the noncanonical communication should be output and a second value indicating a second probability that the normalized version of the noncanonical communication should not be output; and
determine that the normalized version of the noncanonical communication should be output in response to the first value being greater than the second value, and that the normalized version of the noncanonical communication should not be output in response to the second value being greater than the first value.

8. The non-transitory computer readable medium of claim 1, further comprising program code executable by the processor for causing the processor to:
determine the normalized version of the noncanonical communication using the normalizer simultaneously and in parallel to determining that the normalized version of the noncanonical communication should be outputted using the flagger.

9. The non-transitory computer readable medium of claim 1, further comprising program code executable by the processor for causing the processor to:
include the normalized version of the noncanonical communication in a data set for use in textual analysis; and
perform textual analysis on the data set to determine one or more trends indicated by the data set.

10. A method comprising:
receiving an electronic representation of a noncanonical communication;
feeding a vector that is representative of the noncanonical communication as input to a normalizer, wherein the normalizer implements a first neural network to:
receive the vector at an input layer of the first neural network,
perform matrix operations on the vector using a plurality of hidden layers to generate hidden values,
provide hidden values from a final hidden layer of the plurality of hidden layers to an output layer of the first neural network,
perform, at the output layer, a softmax operation on the hidden values to generate a plurality of values representing probabilities of particular characters being in particular positions in a normalized version of the noncanonical communication, and
determine the normalized version of the noncanonical communication based on the plurality of values, wherein the normalized version of the noncanonical communication is different from the noncanonical communication;
feeding the vector as input to a flagger that operates a second neural network that is trained separately from the first neural network;
determining, based on a result from the flagger, that the normalized version of the noncanonical communication should be outputted; and
outputting the normalized version of the noncanonical communication or a corrected version of the normalized version of the noncanonical communication, wherein the corrected version of the noncanonical communication is different from the noncanonical communication.

11. The method of claim 10, further comprising:
in response to determining that the normalized version of the noncanonical communication should be outputted based on the result from the flagger:
outputting the normalized version of the noncanonical communication in response to determining that the normalized version of the noncanonical communication is present in a database; or
outputting the corrected version of the normalized version of the noncanonical communication in response to determining that the normalized version of the noncanonical communication is not present in the database.

12. The method of claim 11, further comprising:
determining the corrected version using a conformer by:
determining a Levenshtein distance between the normalized version of the noncanonical communication and each word of a plurality of words in the database; and selecting as the corrected version a word from the plurality of words in the database associated with a smallest Levenshtein distance.

13. The method of claim 10, further comprising:
preprocessing the noncanonical communication prior to determining the normalized version of the noncanonical communication by:
determining a plurality of vectors associated with the noncanonical communication by transforming each character in the noncanonical communication into a vector comprising a predetermined length; and
concatenating the plurality of vectors together into the vector, the vector comprising another predetermined length.

14. The method of claim 10, wherein each hidden layer of the plurality of hidden layers comprises a layer of units between the input layer and the output layer of the first neural network.

15. The method of claim 10, wherein the first neural network is configured so that every unit of the first neural network only propagates an output value to a subsequent layer of the first neural network.

16. The method of claim 10, wherein the input layer of the first neural network is a first input layer, the output layer of the first neural network is a first output layer, the softmax operation is a first softmax operation, and wherein the second neural network of the flagger:
receives the vector at a second input layer of the second neural network;
performs a plurality of matrix operations on the vector using at least two hidden layers of the second neural network to generate a plurality of hidden values, wherein each hidden layer of the at least two hidden layers comprises a layer of units between the second input layer and a second output layer of the second neural network;
provides one or more hidden values of the plurality of hidden values to the second output layer of the second neural network;
performs, at the second output layer, a second softmax operation on the one or more hidden values to generate a first value indicating a first probability that the normalized version of the noncanonical communication should be output and a second value indicating a second probability that the normalized version of the noncanonical communication should not be output; and
determines that the normalized version of the noncanonical communication should be output in response to the first value being greater than the second value, and that the normalized version of the noncanonical communication should not be output in response to the second value being greater than the first value.

17. The method of claim 10, further comprising:
determining the normalized version of the noncanonical communication using the normalizer simultaneously and in parallel to determining that the normalized version of the noncanonical communication should be outputted using the flagger.

18. The method of claim 10, further comprising:
including the normalized version of the noncanonical communication in a data set for use in textual analysis; and
performing textual analysis on the data set to determine one or more trends indicated by the data set.

19. A system comprising:
a processing device; and
a memory device in which instructions executable by the processing device are stored for causing the processing device to:
receive an electronic representation of a noncanonical communication;
feed a vector that is representative of the noncanonical communication as input to a normalizer, wherein the normalizer is operable for implementing a first neural network to:
receive the vector at an input layer of the first neural network,
perform matrix operations on the vector using a plurality of hidden layers to generate hidden values,
provide hidden values from a final hidden layer of the plurality of hidden layers to an output layer of the first neural network,
perform, at the output layer, a softmax operation on the hidden values to generate a plurality of values representing probabilities of particular characters being in particular positions in a normalized version of the noncanonical communication, and
determine the normalized version of the noncanonical communication based on the plurality of values, wherein the normalized version of the noncanonical communication is different from the noncanonical communication;
feed the vector as input to a flagger for operating a second neural network that is trained separately from the first neural network;
determine, based on a result from the flagger, that the normalized version of the noncanonical communication should be outputted; and
output the normalized version of the noncanonical communication or a corrected version of the normalized version of the noncanonical communication, wherein the corrected version of the noncanonical communication is different from the noncanonical communication.

20. The system of claim 19, wherein the memory device further comprises instructions executable by the processing device for causing the processing device to:
in response to determining that the normalized version of the noncanonical communication should be outputted based on the result from the flagger:
output the normalized version of the noncanonical communication in response to determining that the normalized version of the noncanonical communication is present in a database; and
output the corrected version of the normalized version of the noncanonical communication in response to determining that the normalized version of the noncanonical communication is not present in the database.

21. The system of claim 20, wherein the memory device further comprises instructions executable by the processing device for causing the processing device to:
determine the corrected version using a conformer, the conformer configured to:
determine a Levenshtein distance between the normalized version of the noncanonical communication and each word of a plurality of words in the database; and
select as the corrected version a word from the plurality of words in the database associated with a smallest Levenshtein distance.

22. The system of claim 19, wherein the memory device further comprises instructions executable by the processing device for causing the processing device to:

preprocess the noncanonical communication prior to determining the normalized version of the noncanonical communication by:
  determining a plurality of vectors associated with the noncanonical communication by transforming each character in the noncanonical communication into a vector comprising a predetermined length; and
  concatenating the plurality of vectors together into the vector, the vector comprising another predetermined length.

23. The system of claim 19, wherein each hidden layer of the plurality of hidden layers comprises a layer of units between the input layer and the output layer of the first neural network.

24. The system of claim 19, wherein the first neural network is configured so that every unit of the first neural network only propagates an output value to a subsequent layer of the first neural network.

25. The system of claim 19, wherein the input layer of the first neural network is a first input layer, the output layer of the first neural network is a first output layer, the softmax operation is a first softmax operation, and wherein the second neural network of the flagger is configured to:
  receive the vector at a second input layer of the second neural network;
  perform a plurality of matrix operations on the vector using at least two hidden layers of the second neural network to generate a plurality of hidden values, wherein each hidden layer of the at least two hidden layers comprises a layer of units between the second input layer and the second output layer of the second neural network;
  provide one or more hidden values of the plurality of hidden values to the second output layer of the second neural network;
  perform, at the second output layer, a second softmax operation on the one or more hidden values to generate a first value indicating a first probability that the normalized version of the noncanonical communication should be output and a second value indicating a second probability that the normalized version of the noncanonical communication should not be output; and
  determine that the normalized version of the noncanonical communication should be output in response to the first value being greater than the second value, and that the normalized version of the noncanonical communication should not be output in response to the second value being greater than the first value.

26. The system of claim 19, wherein the memory device further comprises instructions executable by the processing device for causing the processing device to:
  determine the normalized version of the noncanonical communication using the normalizer simultaneously and in parallel to determining that the normalized version of the noncanonical communication should be outputted using the flagger.

27. The system of claim 19, wherein the memory device further comprises instructions executable by the processing device for causing the processing device to:
  include the normalized version of the noncanonical communication in a data set for use in textual analysis; and
  perform textual analysis on the data set to determine one or more trends indicated by the data set.

* * * * *